(12) United States Patent
Droney et al.

(10) Patent No.: US 9,550,559 B1
(45) Date of Patent: Jan. 24, 2017

(54) AIRCRAFT WING ASSEMBLIES

(71) Applicant: The Boeing Company, Chicago, IL (US)

(72) Inventors: Christopher K. Droney, Long Beach, CA (US); Blaine K. Rawdon, San Pedro, CA (US)

(73) Assignee: The Boeing Company, Chicago, IL (US)

(*) Notice: Subject to any disclaimer, the term of this patent is extended or adjusted under 35 U.S.C. 154(b) by 215 days.

(21) Appl. No.: 13/936,790

(22) Filed: Jul. 8, 2013

(51) Int. Cl.
*B64C 9/00* (2006.01)
*B64C 9/18* (2006.01)

(52) U.S. Cl.
CPC ........................................ *B64C 9/18* (2013.01)

(58) Field of Classification Search
CPC ........ B64C 3/48; B64C 3/50; B64C 2003/445; B64C 9/02; B64C 9/16; B64C 9/18; B64C 9/20; B64C 9/28
See application file for complete search history.

(56) References Cited

U.S. PATENT DOCUMENTS

| | | | |
|---|---|---|---|
| 3,853,289 A * | 12/1974 | Nevermann | B64C 9/16 244/215 |
| 4,283,029 A | 8/1981 | Rudolph | |
| 4,426,054 A | 1/1984 | Wang | |
| 4,447,027 A * | 5/1984 | Wang | 244/212 |
| 4,650,140 A * | 3/1987 | Cole | 244/214 |
| 4,813,631 A | 3/1989 | Gratzer | |
| 7,243,881 B2 * | 7/2007 | Sakurai et al. | 244/212 |
| 7,258,308 B2 * | 8/2007 | Beyer et al. | 244/216 |
| 8,336,829 B2 * | 12/2012 | Reckzeh et al. | 244/216 |
| 8,424,807 B2 * | 4/2013 | Sutton et al. | 244/123.1 |
| 2001/0001018 A1 | 5/2001 | Boon | |
| 2007/0114329 A1 * | 5/2007 | Lacy et al. | 244/34 R |
| 2011/0001018 A1 | 1/2011 | Hamilton et al. | |
| 2013/0146717 A1 * | 6/2013 | Santini | 244/219 |

OTHER PUBLICATIONS

Peter K.C. Rudolph, "High-Lift Systems on Commercial Subsonic Airliners", NASA Contractor Report 4746, Sep. 1996, 166 pages.

* cited by examiner

*Primary Examiner* — Tien Dinh
*Assistant Examiner* — Aaron Rodziwicz
(74) *Attorney, Agent, or Firm* — Hanley, Flight & Zimmerman, LLC

(57) ABSTRACT

Aircraft wing assemblies are disclosed herein. An example apparatus disclosed herein includes a trailing edge of a wing of an aircraft. The trailing edge has a flexible skin defining a first surface. The example apparatus also includes a flap movably coupled to the trailing edge. The flap defines a second surface. The first surface and the second surface form a substantially continuous surface when the flap is in a stowed position and when the flap is in a deployed position.

35 Claims, 18 Drawing Sheets

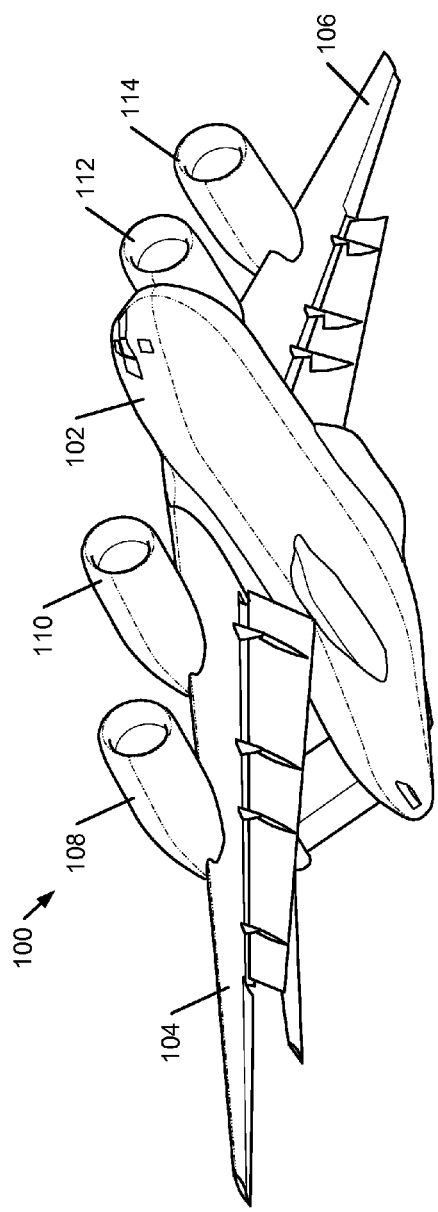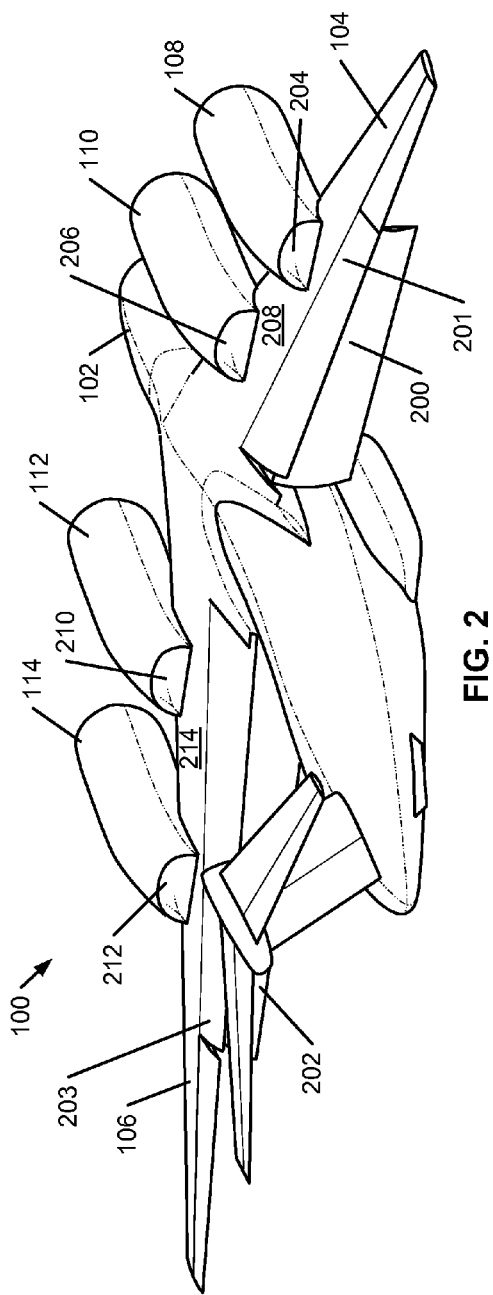

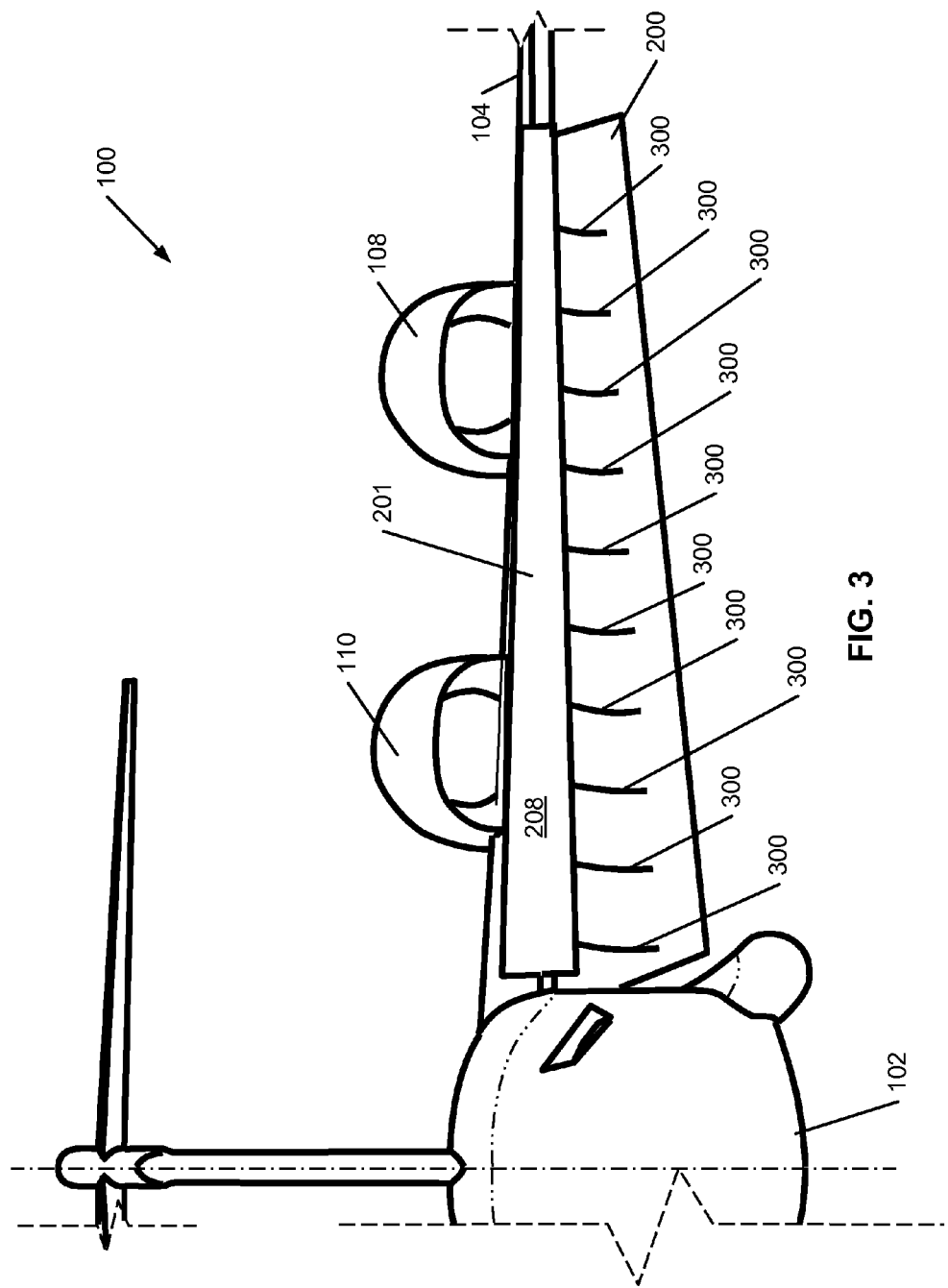

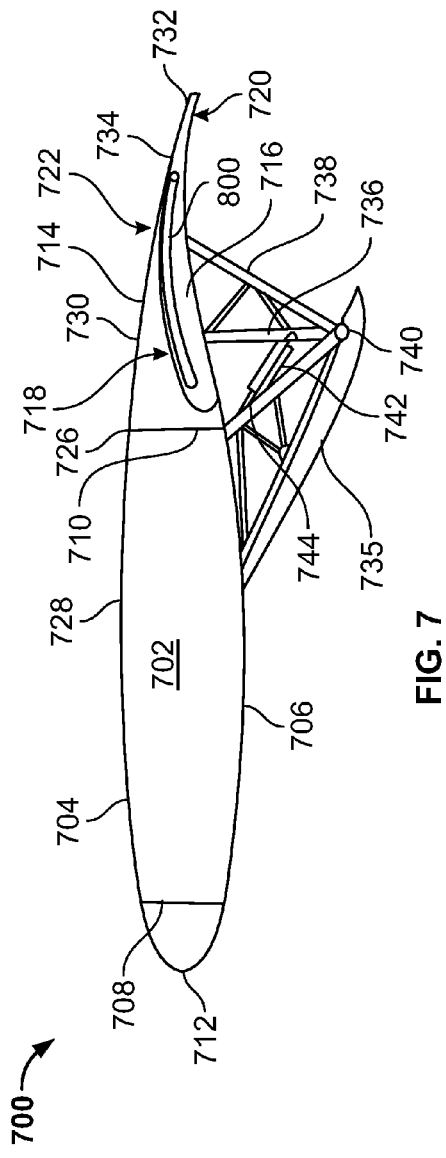
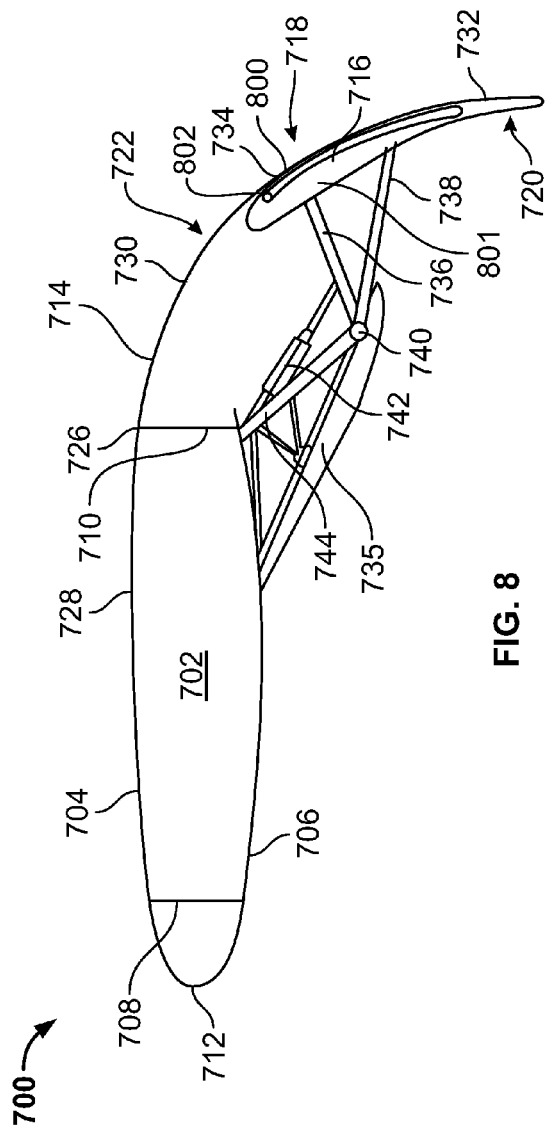
FIG. 7
FIG. 8

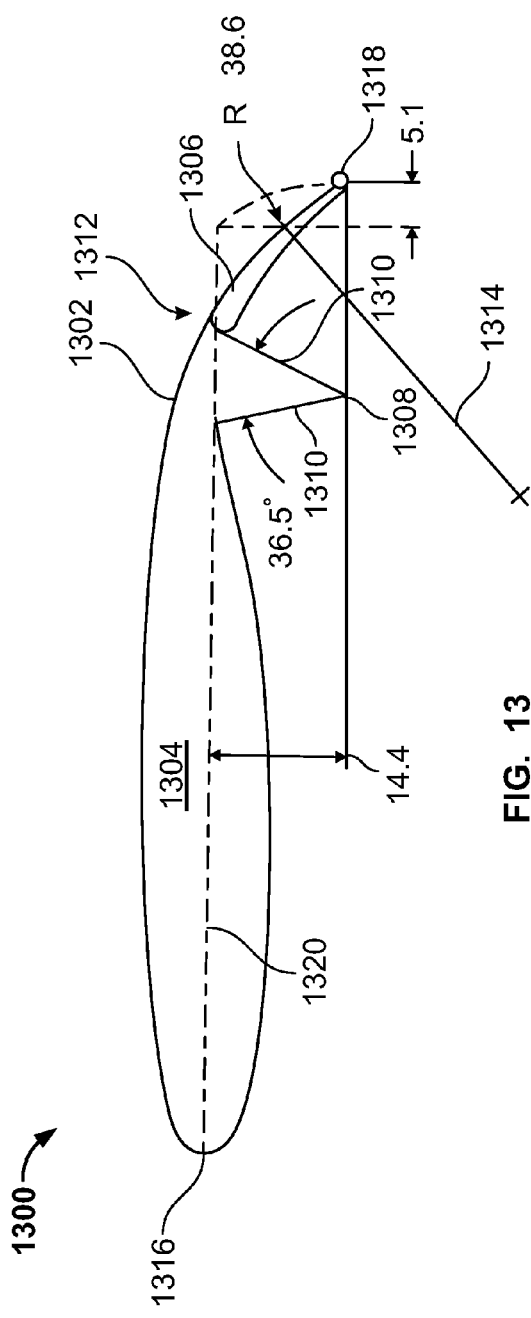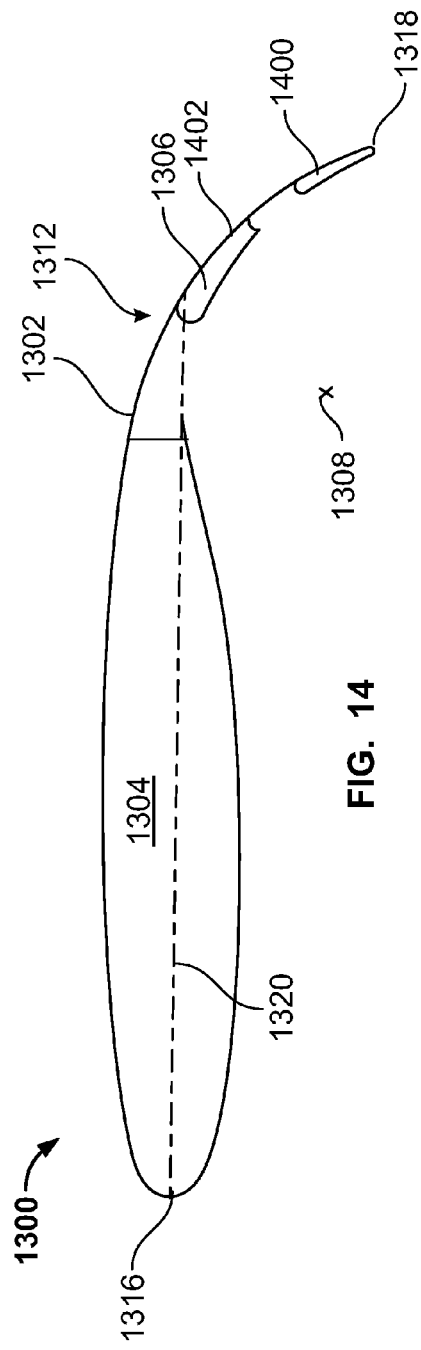

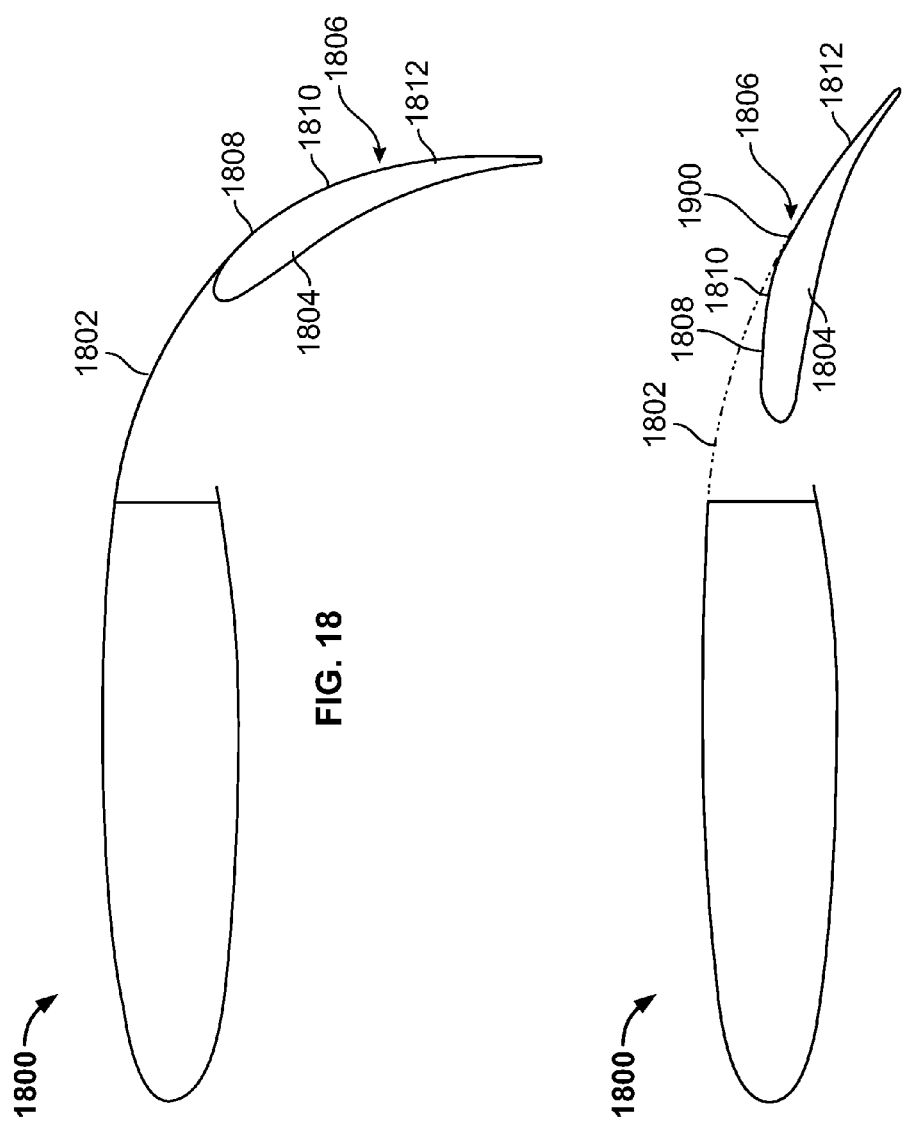

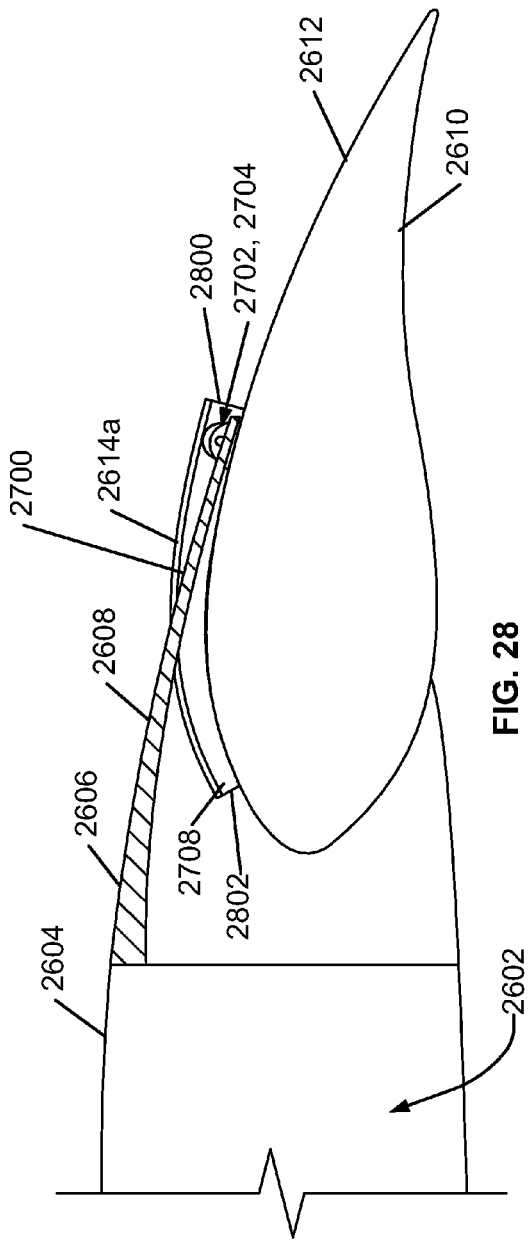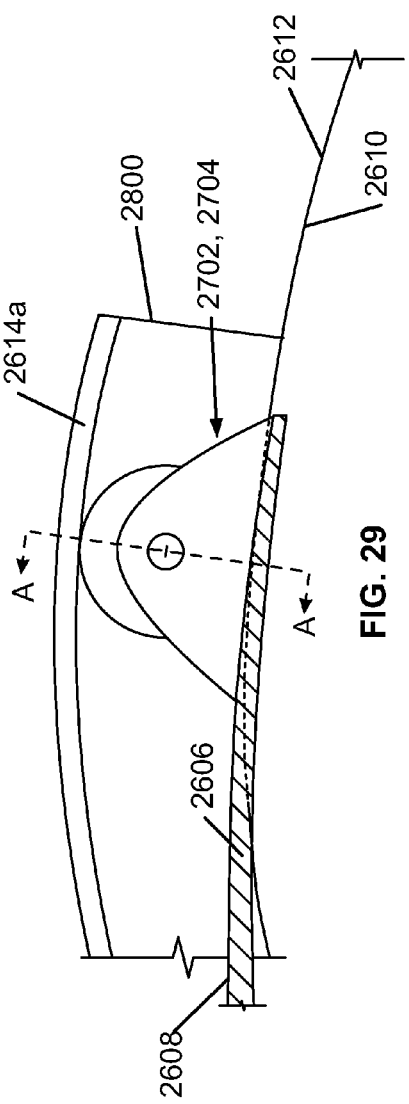
FIG. 28
FIG. 29

AIRCRAFT WING ASSEMBLIES

FIELD

The present disclosure relates generally to aircraft lift systems and, more particularly, to aircraft wing assemblies.

BACKGROUND

Generally, an aircraft wing includes flaps to increase a lift coefficient of the wing. Blown flaps employ efflux (e.g., air and/or exhaust) of engines to provide lift. The engines may be disposed above or beneath the wings. If the engines are disposed above the wings, the flaps are upper surface blown flaps and the efflux of the engines interacts with upper surfaces of the wings and the flaps to provide lift. For example, the efflux may follow a curvature of the upper surfaces of the wings and the flaps to provide lift.

SUMMARY

An example apparatus disclosed herein includes a trailing edge of a wing of an aircraft. The trailing edge has a flexible skin defining a first surface. The example apparatus also includes a flap movably coupled to the trailing edge. The flap defines a second surface. The first surface and the second surface form a substantially continuous surface when the flap is in a stowed position and when the flap is in a deployed position.

Another example apparatus includes a trailing edge of a wing of an aircraft. The example apparatus also includes a flap movably coupled to the trailing edge. The flap and the trailing edge are to form a substantially continuous upper blown surface. The trailing edge is to deflect from a first shape to a second shape when the flap moves from a first position to a second position.

Another example apparatus includes a trailing edge of a wing of an aircraft. The trailing edge is elastically deformable. The example apparatus also includes a flap movably coupled to the trailing edge. The trailing edge and the flap are to define a substantially continuous upper blown surface. The trailing edge is to have a first curvature when the flap is in a first position and a second curvature when the flap is in a second position aft of the first position.

The features, functions and advantages that have been discussed can be achieved independently in various examples or may be combined in yet other examples further details of which can be seen with reference to the following description and drawings.

BRIEF DESCRIPTION OF THE DRAWINGS

FIG. 1 is a front, perspective view of an example aircraft including example first and second wing assemblies disclosed herein.

FIG. 2 is a rear, perspective view of the example aircraft of FIG. 1.

FIG. 3 is a rear view of the example aircraft of FIGS. 1 and 2 illustrating a first flap of the first wing assembly in a deployed position.

FIG. 7 is a schematic of an example wing assembly disclosed herein having a flexible trailing edge in a first position and a flap in a stowed position.

FIG. 8 is a schematic of the example wing assembly of FIG. 7 illustrating the flexible trailing edge in a second position and the flap in a deployed position.

FIG. 13 is a schematic illustrating another example wing assembly disclosed herein having a flexible trailing edge.

FIG. 14 is a schematic illustrating the example wing assembly of FIG. 13 including a flap having a first section movable relative to a second section.

FIG. 18 is a schematic illustrating another example wing assembly disclosed herein including a flap shaped to generate drag when disposed in a deployed position.

FIG. 19 is a schematic illustrating the example flap of FIG. 18 in a semi-deployed position.

FIG. 28 is a side, cross-sectional view of the example wing assembly of FIGS. 26-27.

FIG. 29 is a side view of the example track of FIG. 28.

Figure 4:
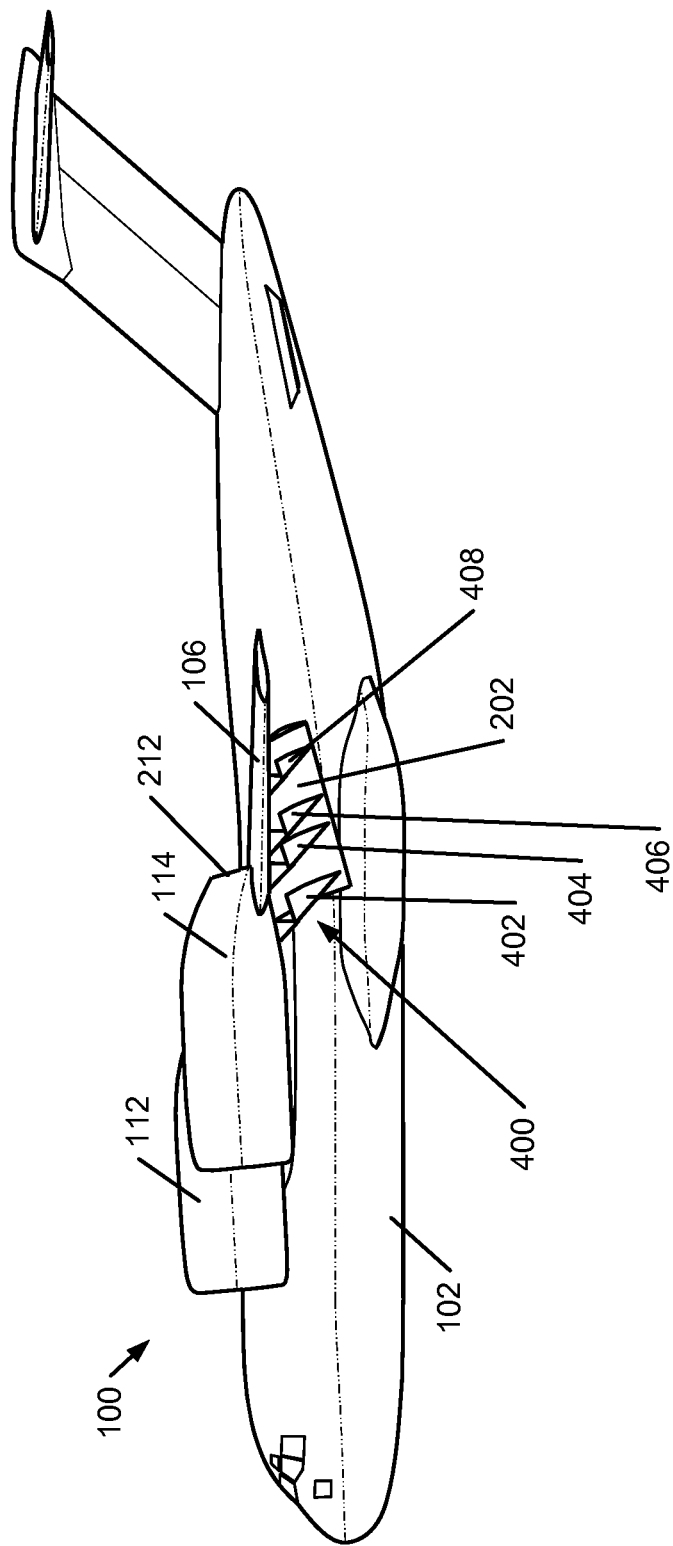
FIG. 4 is a side view of the example aircraft of FIGS. 1-3 illustrating a second flap of the second wing assembly in the deployed position.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Example aircraft wing assemblies disclosed herein include flaps movably coupled to flexible trailing edges. A portion of a wing assembly that defines an upper surface of the wing assembly aft of a wing box and fore of at least a portion of a flap is referred to herein as "a trailing edge." The example trailing edges disclosed herein elastically deform (e.g., bend) to enable the flaps to move through a wide range of motion. As a result, a flow turning of the example wing assemblies disclosed herein via the Coanda effect may be adjusted to enable short aircraft take-off distances and low aircraft landing speeds. Flow turning is an ability of a surface to influence fluid (e.g., air) flowing near and/or in contact with the surface to follow a curvature of a surface. The Coanda effect is a tendency of a flowing fluid (e.g., air) near and/or in contact with a surface to follow a profile or curvature of the surface. A turning efficiency of the surface is an angle at which the fluid turns about the surface ("a flow turning angle") via the Coanda effect divided by an angle through which the surface curves. The flow turning and, thus, the turning efficiency is a function of a size of a radius of curvature of the surface, a smoothness of the surface (e.g., gaps in the surface may reduce the turning efficiency), changes of the radius of curvature of the surface over a chord (e.g., length) of the surface, characteristics of the fluid (e.g., flow rate(s) of the fluid) and/or other factors. The turning efficiency of a flap is a function of radius of curvature of the flap, an angle and/or distance through which the flap moves, and throttle settings (e.g., a flow rate of efflux) of an aircraft and/or other factors and/or conditions. In some examples, increasing the flow turning angle of a surface decreases a turning efficiency of the surface.

An example aircraft wing assembly disclosed herein includes a flexible trailing edge and a flap movably coupled to the trailing edge. In some examples, the trailing edge and the flap form a substantially continuous upper blown surface (e.g., an upper surface onto which an efflux of one or more engines is directed). The trailing edge elastically deforms during flight when the flap applies a load to the trailing edge. In some examples, the trailing edge is fixedly coupled to a spar of a wing box, and the trailing edge bends from a junction of the trailing edge and the spar during flight. For example, if the flap is in a retracted or stowed position (e.g., a position in which some or all of the flap is covered by the trailing edge), the flap may apply a force to the wing assembly that deforms the trailing edge to decrease a camber of the trailing edge (e.g., the trailing edge may straighten). If the flap is moved from the stowed position to a deployed position, the flap may apply a load to the trailing edge to bend the trailing edge such that a camber (e.g., curvature) of the trailing edge and, thus, a camber of the wing assembly increases.

Deflection of the trailing edge facilitates a wide range of motion (e.g., rotation) of the flap as the flap moves between the stowed position to the deployed position. As a result, adjustment of the flap enables the example wing assemblies disclosed herein to provide a low flow turning angle and a high turning efficiency during take-off and a high flow turning angle and a low turning efficiency during landing with sufficient lift to enable shorter take-off distances and lower landing speeds than aircraft employing traditional wings having rigid trailing edges. In addition, the flexible trailing edges disclosed herein enable the example wing assemblies disclosed herein to employ smaller flap support assemblies (e.g., fairings, links, actuators, hinges, etc.) and/or wing boxes with larger volumes than traditional wings. Thus, the example wing assemblies disclosed herein may be lighter than and/or have larger fuel volume capacities than traditional wings.

FIG. 1 is front, perspective view of an example aircraft 100 disclosed herein. In the illustrated example, the aircraft 100 includes a fuselage 102, a first wing assembly 104 and a second wing assembly 106. A first engine 108 and a second engine 110 are coupled to the example first wing assembly 104. A third engine 112 and a fourth engine 114 are coupled to the example second wing assembly 106. Other example aircraft include other numbers (e.g., 1, 2, 3, 5, etc.) of engines.

FIG. 2 is a rear, perspective view of the example aircraft 100 of FIG. 1. In the illustrated example, the first wing assembly 104 includes a first flap 200 movably coupled to a first flexible trailing edge 201. The example second wing assembly 106 includes a second flap 202 movably coupled to a second flexible trailing edge 203. Although the example first flap 200 and the example second flap 202 are each shown being monolithic, each of the first flap 200 and/or the second flap 202 may comprise two or more flaps, which may be spaced apart spanwise along the respective wing assemblies 104, 106 and/or independently moveable (e.g., extendible, retractable, etc.). The example first flap 200 and the example second flap 202 of FIG. 2 are in a deployed position. When the example first flap 200 and the example second flap 202 are in the deployed position, cambers (e.g., curvatures) of the first wing assembly 104 and the second wing assembly 106 are substantially maximized. In the illustrated example, the first wing assembly 104 and the second wing assembly 106 are mirror images but are otherwise substantially similar or the same. In other examples, the first wing assembly 104 is a different shape and/or size than the second wing assembly 106.

In the illustrated example, a first nozzle 204 of the first engine 108 and a second nozzle 206 of the second engine 110 are disposed above the first wing assembly 104 in the orientation of FIG. 2. The first nozzle 204 and the second nozzle 206 direct efflux (e.g., air and/or exhaust) of the first engine 108 and the second engine 110, respectively, onto and/or along a first upper surface 208 of the first wing assembly 104. As the efflux flows along the first upper surface 208, the efflux follows a curvature of the first upper surface 208 and, thus, flows downward. As a result, the efflux generates lift. A phenomenon in which the efflux follows the curvature of the first wing assembly 104 and/or the second wing assembly 106 is referred to herein as "the Coanda Effect."

In the illustrated example, a third nozzle 210 of the third engine 112 and a fourth nozzle 212 of the fourth engine 114 are disposed above the second wing assembly 106 in the orientation of FIG. 2. The third nozzle 210 and the fourth nozzle 212 direct efflux of the third engine 112 and the fourth engine 114, respectively, onto and/or along a second upper surface 214 of the second wing assembly 106. As the efflux flows along the second upper surface 214, the efflux follows a curvature of the second upper surface 214 and, thus flows downward. As a result, the efflux of the third engine 112 and the fourth engine 114 generates lift.

FIG. 3 is a rear view of the example first wing assembly 104 of the aircraft of FIGS. 1-2. In the illustrated example, the first flap 200 includes a plurality of tracks 300 defining a motion path of the first flap 200 relative to the first trailing edge 201. In the illustrated example, the tracks 300 are curved. In other examples, the tracks 300 are other shapes. In the illustrated example, the tracks 300 are spaced apart spanwise along the first flap 200. The second flap 202 of the example second wing assembly 106 includes tracks that are mirror images of the tracks 300 but are otherwise substantially similar or identical to the example tracks 300 of FIG. 3.

In some examples, the first trailing edge 201 and the second trailing edge 203 elastically deform under loads applied by the first flap 200 and the second flap 202, respectively. In the illustrated example, the loads applied by the first flap 200 and the second flap 202 change (e.g., increase or decrease) as the example first flap 200 and the example second flap 202 move relative to the first trailing edge 201 and the second trailing edge 203 (e.g., via the tracks 300). As a result, the first trailing edge 201 and the second trailing edge 203 bend or flex when the first flap 200 and the second flap 202, respectively, extend or retract. In some examples, the loads applied by the first flap 200 and the second flap 202 to the first trailing edge 201 and the second trailing edge 203 are affected and/or influenced by air flowing around the first flap 200 and the second flap 202, respectively.

FIG. 4 is a side view of the example aircraft 100 of FIGS. 1-3 illustrating the second flap 202 in the deployed position. In some examples, the first flap 200 and the second flap 202 are moved to the deployed position before and/or during landing (e.g., landing approach, touchdown, and/or rollout). In the illustrated example, the second wing assembly 106 includes a flap support assembly 400. The example flap support assembly 400 includes a plurality of fairings 402, 404, 406, 408. In some examples, the flap support assembly 400 includes one or more actuators to move the second flap 202 between a retracted or stowed position and the deployed position. The example first wing assembly 104 includes a flap support assembly substantially similar or identical to the flap support assembly 400 of FIG. 4.

Figure 5:
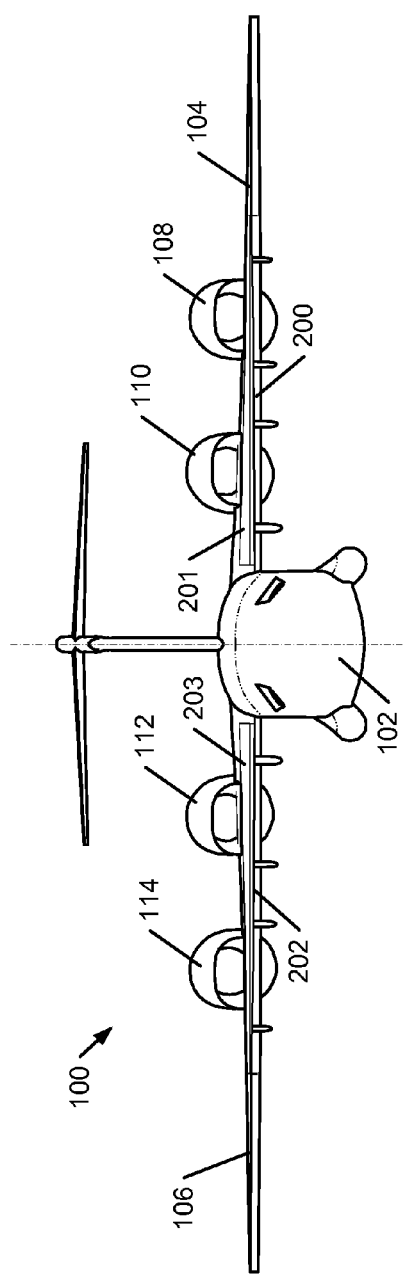
FIG. 5 is a rear view of the example aircraft of FIGS. 1-4 illustrating the example first and second flaps a stowed position.
Figure 6:
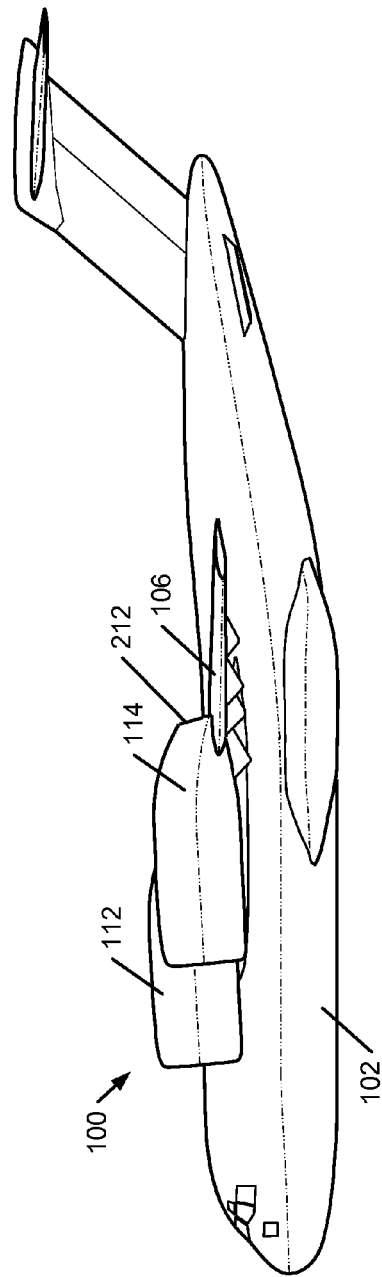
FIG. 6 is a side view of the example aircraft of FIGS. 1-5 illustrating the example first and second flaps in the stowed position.

FIGS. 5-6 illustrate the example aircraft of FIGS. 1-4 in which the first flap 200 and the second flap 202 are in the stowed position. In some examples, the first flap 200 and/or the second flap 202 are in the stowed position during a cruising phase of flight in which the example aircraft 100 is flying at a substantially constant or level altitude and/or airspeed. In some examples, when the first flap 200 and/or the second flap 202 are in the stowed position, portions of the first flap 200 and the second flap 202 are covered by (e.g., retracted into and/or beneath) the first trailing edge 201 and the second trailing edge 203, respectively, to reduce and/or minimize the cambers and/or surface areas of the first wing assembly 104 and the second wing assembly 106.

FIG. 7 is a schematic, cross-sectional view of an example wing assembly 700 disclosed herein, which may be used to implement the example first wing assembly 104 and/or the example second wing assembly 106 of FIGS. 1-6. The example wing assembly 700 of FIG. 7 includes a wing box 702. The example wing box 702 includes an upper skin 704, a lower skin 706, a first (e.g., front) spar 708 and a second (e.g., rear) spar 710. In the illustrated example, the upper skin 704 is coupled to the lower skin 706 fore of the first spar 708 to form a leading edge 712 of the wing assembly 700.

The example wing assembly 700 also includes a trailing edge 714 and a flap 716. In the illustrated example, the trailing edge 714 is fixedly coupled to the second spar 710. In the illustrated example, the flap 716 is in a stowed position in which a first section 718 of the flap 716 is covered by the trailing edge 714 and a second section 720 of the flap 716 extends aft of the trailing edge 714. In some examples, when the flap 716 is in the stowed position, the first section 718 and the second section 720 of the flap 716 are covered by the trailing edge 714. In some examples, the flap 716 is in the stowed position during a cruising stage of flight to reduce and/or minimize a surface area of the wing assembly 700.

In the illustrated example, the trailing edge 714 is in a first position. When the trailing edge 714 is in the first position, the trailing edge 714 has a first shape (e.g., curvature). As described in greater detail below, when the flap 716 moves from the stowed position to a deployed position (FIG. 8), the trailing edge 714 elastically deforms (e.g., bends or deflects) to a second position and has a second shape.

In the illustrated example, the upper skin 704, the trailing edge 714 and the flap 716 of the example wing assembly 700 of FIG. 7 form a substantially continuous upper blown surface 722 (e.g., a surface with substantially no gaps). In the illustrated example, the upper skin 704 and the trailing edge 714 meet (e.g., couple, join and/or abut) at a first juncture 726 at and/or along the second spar 710. In some examples, a first surface 728 of the upper skin 704 has a same slope as a second surface 730 of the trailing edge 714 at the first juncture 726 (e.g., a tangency continuity is present between the first surface 728 and the second surface 730 at the first juncture 726).

In the illustrated example, the flap 716 includes a third surface 732 (e.g., an upper surface) that meets the second surface 730 of the trailing edge 714 at a second juncture 734. Thus, when the example flap 716 is in the stowed position, the third surface 732 along the second section 720 of the flap 716 forms a portion of the example upper blown surface 722 of FIG. 7. In the illustrated example, the second surface 730 and the third surface 732 have substantially a same slope at the second juncture 734 (e.g., a tangency continuity is present between the second surface 730 and the third surface 732 at the second juncture 734).

The example flap is movable between the stowed position and the deployed position (FIG. 8). In the illustrated example, the flap 716 is rotatably coupled to a flap support (e.g., a link or brace covered by a fairing 735) via a first link 736 and a second link 738. The example flap support, the first link 736 and the example second link 738 are operatively coupled to a hinge 740. An actuator 742 is operatively coupled to the first link 736 to rotate the flap 716 about the hinge 740. Thus, the example hinge 740 defines an axis of rotation of the flap 716 of FIG. 7, and the example flap 716 is movable in a substantially circular path about the hinge 740. In other examples, the flap 716 is movable in a non-circular path relative to the wing box 702. In the illustrated example, the actuator 742 is coupled to a third link 744. The example third link 744 is coupled to the wing box 702 and the flap support covered by the fairing 735. In other examples, the flap 716 is movably coupled to the wing box 702 via a track, a four bar linkage, a six bar linkage, a multi-bar link, and/or any other mechanism(s).

FIG. 8 is a schematic, cross-sectional view of the example wing assembly 700 of FIG. 7 illustrating the example flap 716 in the deployed position. The example flap 716 of FIG.

8 is movably coupled to the trailing edge 714 to enable the flap 716 to move relative to the trailing edge 714 as the flap 716 rotates about the hinge 740. In the illustrated example, the flap 716 includes a track 800. The example track 800 of FIG. 8 is disposed on and/or coupled to a side 801 of the flap 716. In some examples, the flap 716 defines a channel, and the track 800 is disposed in the channel. In some examples (e.g., the examples of FIGS. 26-30 disclosed below), the track 800 is disposed on and/or coupled to the third surface 732 of the flap 716. A roller assembly 802 (e.g., one or more wheels) is disposed in the track 800 and coupled to the trailing edge 714. Thus, the example roller assembly 802 operatively couples the trailing edge 714 to the flap 716. In other examples, the trailing edge 714 includes a slider (e.g., an arm or protrusion fixedly coupled to the trailing edge 714) disposed in the track 800 to slidably couple the flap 716 to the trailing edge 714. In some example, the slider and/or the track 800 include lubricant(s) and/or low-friction materials such as, for example, plastic to facilitate movement of the slider along the track 800.

When the example actuator 742 actuates, the actuator 742 rotates the flap 716 about the hinge 740. As the flap 716 rotates about the hinge 740, the flap 716 moves fore or aft relative to the trailing edge 714 about a motion path defined by the track 800. When the example flap 716 is in the deployed position, a camber of the example wing assembly 700 is maximized.

In the illustrated example, a position and/or movement of the flap 716 affects a load applied by the flap 716 to the trailing edge 714. In the illustrated example, the track 800 is curved. A first radius of curvature of the example track 800 is greater than a turning radius of the flap 716 about the hinge 740. In other examples, the first radius of curvature of the track 800 is less than or the same as the turning radius of the flap 716 about the hinge 740. The example track 800 curves and/or extends away from (e.g., not along) a circular path of the flap 716 about the hinge 740. Thus, the track 800 is not concentric to the circular path of the flap 716. As a result, the track 800 and the roller assembly 802 function as a cam and a follower, respectively, as the flap 716 rotates about the hinge 740. For example, as the flap 716 moves from the stowed position illustrated in FIG. 7 to the deployed position illustrated in FIG. 8, the flap 716 pulls downward on the trailing edge 714 in the orientation of FIG. 8. In the illustrated example, the flap 716 applies a maximum load to the trailing edge 714 when the flap 716 is in the stowed position and/or the deployed position.

In the illustrated example, the trailing edge 714 is flexible or elastically deformable. As a result, the trailing edge 714 elastically deforms (e.g., bends) under the load applied to the trailing edge 714 by the flap 716. In some examples, when the trailing edge 714 is in the second position (e.g., when the flap 716 is in the deployed position), the trailing edge has a second shape (e.g., curvature) different than the first shape of the trailing edge 714 in the first position (e.g., when the flap 716 is in the stowed position). In some examples, the second shape has a smaller radius of curvature than the first shape. In some examples, a change in curvature of the trailing edge 714 is substantially uniform along a chord (e.g., a length from the first juncture 726 to the second juncture 734) of the trailing edge 714 when the trailing edge 714 deflects (e.g., elastically deforms) from the first shape to the second shape. In the illustrated example, when the example flap 716 is in the deployed position, a curvature of the upper blown surface 722 has a substantially constant radius. In some examples, a second actuator is operatively coupled to the trailing edge 714 to apply a load to the trailing edge 714 to elastically deform the trailing edge 714. In some examples, the second actuator cooperates with the flap 716 to elastically deform the trailing edge 714. In other examples, the flap 716 does not apply a load to the trailing edge 714, and the second actuator controls an amount of elastic deformation of the trailing edge 714.

Figure 9:
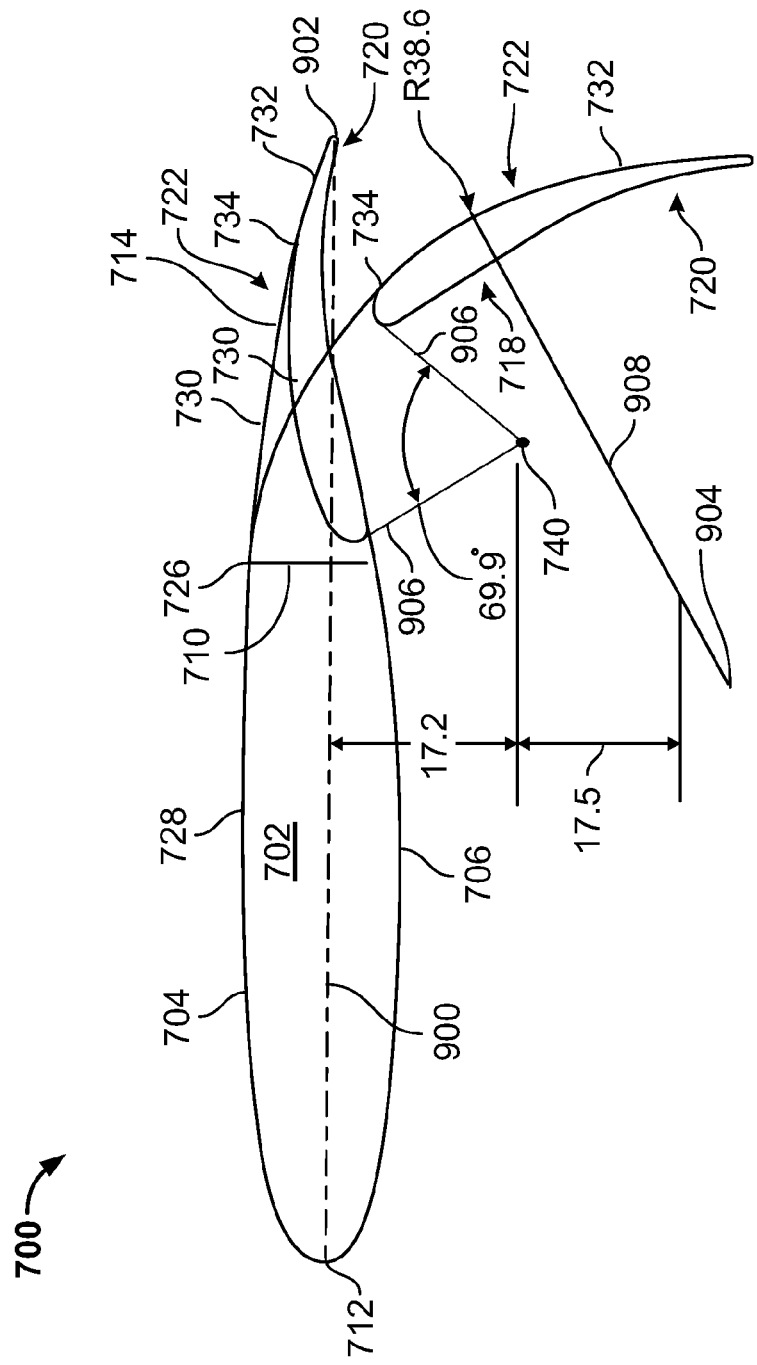
FIG. 9 is a schematic of the example wing assembly of FIGS. 7-8 illustrating a range of motion of the flap between the stowed position and deployed position.

FIG. 9 is a schematic of the example wing assembly 700 of FIGS. 7-8 illustrating a range of motion of the example flap 716. Deflection or flexure of the trailing edge 714 enables the example flap 716 to move through a greater range of motion than upper blown flaps of traditional wings with rigid or inflexible trailing edges. For example, the deflection of the trailing edge 714 from the first position to the second position facilitates rotation of the flap 716 and, thus, adjustment of the camber of the upper blown surface 722. In the illustrated example, a chord line 900 of the wing assembly 700 is substantially horizontal in the orientation of FIG. 9. In other examples, the chord line 900 is not horizontal. The chord line 900 is a line extending from the leading edge 712 of the example wing assembly 700 to a tip 902 of the flap 716 when the flap 716 is in the stowed position. When the example flap 716 is in the stowed position, the trailing edge 714 is disposed above the chord line 900 in the orientation of FIG. 9. In other examples, the trailing edge 714 is in other locations relative to the chord line 900 when the flap 716 is in the stowed position.

In the illustrated example, the deflection of the trailing edge 714 enables the flap 716 of FIG. 9 to rotate 69.9 degrees about the hinge 740 when the flap 716 moves from the stowed position to the deployed position. However, the above-noted angle is merely an example and, thus, other angles of rotation may be used without departing from the scope of this disclosure. When the flap 716 is in the deployed position, the flap 716 and a portion of the trailing edge 714 are disposed below the chord line 900 in the orientation of FIG. 9. In addition, the tip 902 of the example flap 716 is farther from the chord line 900 than the hinge 740 and a center of curvature 904 of the upper blown surface 722. In other examples, the tip 902 of the flap 716 is in other locations relative to the chord line 900, the hinge 740 and/or the center of curvature 904 when the flap 716 is in the deployed position.

The deflection of the trailing edge 714 also enables a turning radius 906 of the flap 716 to be smaller than a radius of curvature 908 of the upper blown surface 722. As a result, the example wing assembly 700 employs a smaller and/or simplified flap support assembly (e.g., the fairing 735, the first link 736, the second link 738, the third link 744, the fourth link, the actuator 742) and/or a larger wing box (e.g., the wing box 702) than traditional wings having rigid trailing edges. In the illustrated example, the turning radius 906 is a radius about which the flap 716 rotates via the hinge 740. The example flap 716 of FIG. 7 moves in a substantially circular path. Thus, the example turning radius 906 of FIG. 9 is substantially constant. In other examples (e.g., the examples illustrated in FIGS. 16-17), the flap 716 moves in a non-circular path and, thus, the turning radius 906 is not constant. For example, the turning radius 906 may increase, decrease, vary, etc. as the flap 716 moves between the stowed position and the deployed position. In some examples, the flap 716 moves linearly (e.g., translates) and/or rotates as the flap 716 moves between the stowed position and deployed position.

The radius of curvature 908 of the upper blown surface 722 is a radius extending from the center of curvature 904 of the upper blown surface 722 to the upper blown surface 722. Because the turning radius 906 of the flap 716 is less than the radius of curvature 908 of the upper blown surface 722, the axis of rotation of the flap 716 and, thus, the hinge 740 may be disposed closer to the chord line 900 than the center of curvature 904 of the upper blown surface 722. In the illustrated example, the hinge 740 is a first distance from the chord line 900 corresponding 17.2 percent of a length of the chord line 900. The example center of curvature 904 of the upper blown surface 722 when the flap 716 is in the deployed position is a second distance from the chord line 900 corresponding to 34.7 percent of the length of the chord line 900. In the illustrated example, the radius of curvature 908 of the upper blown surface 722 when the flap 716 is in the deployed position has a substantially constant length corresponding to 38.6 percent of the length of the chord line 900.

The deflection of the trailing edge 714 also enables the upper blown surface 722 to be substantially continuous as the flap 716 moves relative to the trailing edge 714. For example, the trailing edge 714 bends with movement of the flap 716, thereby maintaining or preserving the second junction 734 as the flap 716 moves between the stowed position and the deployed position. In the illustrated example, the trailing edge 714 also bends to enable a radius of curvature of the second surface 730 to be substantially similar or identical to a radius of curvature of the third surface 732. Thus, although the turning radius 906 of the flap 716 is less than the radius of curvature 908 of the upper blown surface 722, the deflection of the trailing edge 714 enables the radius of curvature 908 of the upper blown surface 722 along the trailing edge 714 and the flap 716 to be substantially constant.

Figure 10:
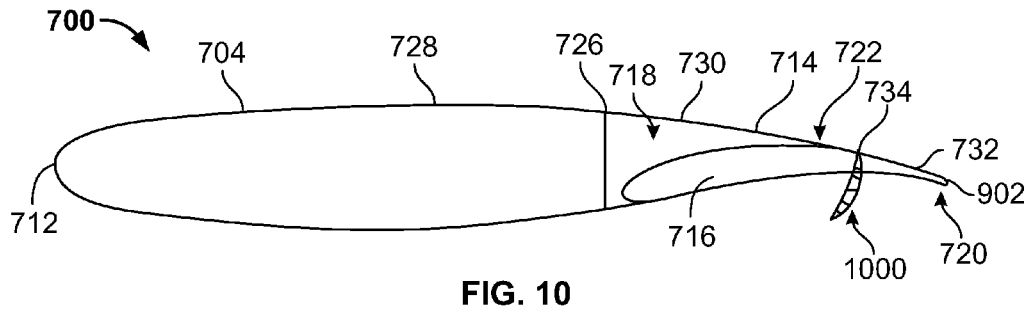
FIG. 10 is a schematic of the example wing assembly of FIGS. 7-9 illustrating the flap in the stowed position and a plot illustrating a tangency discontinuity between the trailing edge and the flap.
Figure 11:
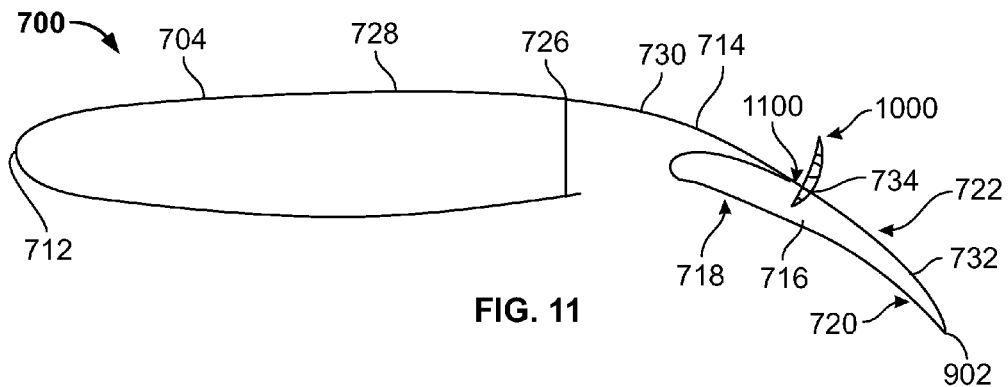
FIG. 11 illustrates the plot of FIG. 10 and a schematic of the example wing assembly of FIGS. 7-10 illustrating the flap in a semi-deployed position.
Figure 12:
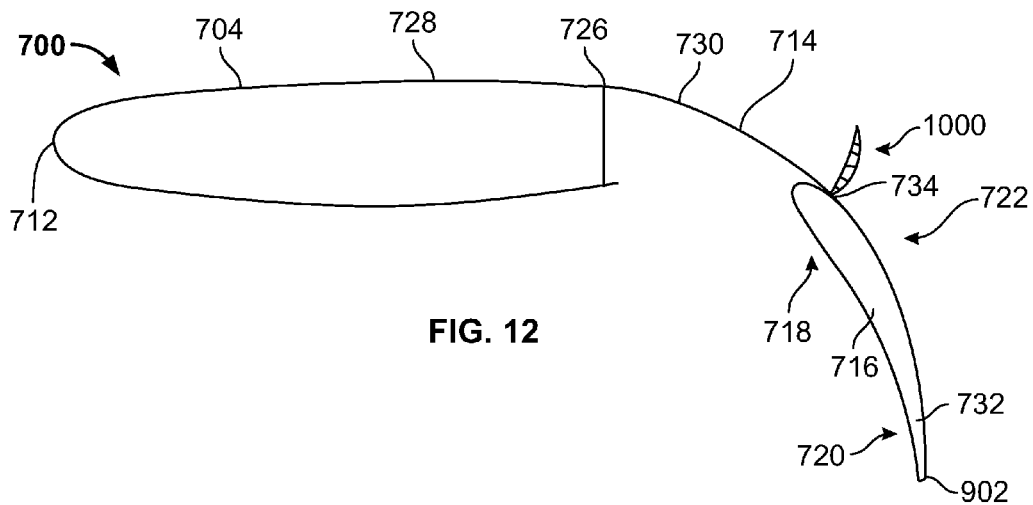
FIG. 12 illustrates the plot of FIGS. 10-11 and a schematic of the example wing assembly of FIGS. 7-11 illustrating the flap in the deployed position.

FIGS. 10-12 are schematics of the example wing assembly 700 of FIGS. 7-9 including a plot 1000 of a difference between a first slope of the second surface 730 of the trailing edge 714 and a second slope of the third surface 732 of the flap 716 at the second juncture 734 as the flap 716 moves from the stowed position (FIG. 10) to the deployed position (FIG. 12). Referring to FIG. 10, when the example flap 716 is in the stowed position, the second surface 730 and the third surface 732 have substantially the same slope at the second juncture 734. Referring to FIG. 11, as the flap 716 moves from the stowed position toward the deployed position, and the second slope changes relative to the first slope at the second juncture 734. As a result, a tangency discontinuity between the second surface 730 and the third surface 732 (e.g., a difference between the first slope and the second slope) is present at the second juncture 734 when the example flap 716 is in a position between the stowed position and the deployed position. In the illustrated example, a maximum tangency discontinuity between the second surface 730 and the third surface 732 is 7.8 degrees when the example flap 716 is in a position 49.2 percent through the example motion path defined by the track 800 relative to the stowed position. In some examples, the maximum tangency discontinuity is present at other positions along the track 800. Other examples have other maximum tangency discontinuities and/or substantially no tangency discontinuity. When the tangency discontinuity exists between the second surface 730 and the third surface 732, a portion of the upper blown surface 722 forms a concavity 1100 at or near the second juncture 734. Referring to FIG. 12, when the example flap 716 is in the deployed position, the first slope and the second slope are substantially the same. In some examples, the portion of the upper blown surface 722 forms a convexity at or near the second juncture 734 when the flap 716 is in the stowed position and/or deployed position. In some examples, no tangency discontinuities are present when the flap 716 is in one or more positions between the stowed position and the deployed position (e.g., when the flap 716 is approximately 25 percent through the example motion path defined by the track 800).

In some examples, the trailing edge 714 includes a second roller assembly disposed in the track 800 of the flap 716 to substantially prevent the tangency discontinuity between the second surface 730 and the third surface 732 at the second juncture 734 as the flap 716 moves between the stowed position and the deployed position.

FIG. 13 is a schematic of another example wing assembly 1300 disclosed herein. In the illustrated example, the wing assembly 1300 includes a flexible trailing edge 1302 fixedly coupled to a wing box 1304. A flap 1306 is movably coupled to the trailing edge 1302 to enable the flap 1306 to move from a stowed position to a deployed position. The example flap 1306 of FIG. 13 rotates about a pivot 1308 (e.g., a hinge) via a first flap support assembly (not shown) (e.g., a fairing, one or more links, an actuator, and/or any other components). In the illustrated example, the flap 1306 rotates about the pivot 1308 via a substantially constant turning radius 1310. When the flap 1306 rotates about the pivot 1308, the flap 1306 applies a force to the trailing edge 1302. As a result, the trailing edge 1302 elastically deforms (e.g., bends). In the illustrated example, the flap 1306 and the trailing edge 1302 form a substantially continuous upper blown surface 1312. In the illustrated example, the upper blown surface 1312 has a substantially constant radius of curvature 1314.

In the illustrated example, the flap 1306 is in the deployed position. When the example flap 1306 moves from the stowed position to the deployed position, a chord of the wing assembly 1300 (e.g., a distance between a leading edge 1316 of the wing assembly 1300 and a rear tip 1318 of the flap 1306) increases from a first length to a second length. Motion of the example flap 1306 that increases the length of the chord is referred herein as "Fowler motion." In the illustrated example, the second length is a length of 105.1 percent of the first length. In other examples, the second length is other lengths. When the example flap 1306 is in the deployed position, the rear tip 1318 of the flap 1306 is about a same distance from a chord line 1320 of the wing assembly 1300 as the pivot 1308. In the illustrated example, the pivot 1308 and the rear tip 1318 of the flap 1306 are a distance of 14.4 percent of the first length from the chord line 1320. However, the above-noted dimension is merely an example and, thus, other dimensions may be used without departing from the scope of this disclosure.

FIG. 14 illustrates the example wing assembly 1300 of FIG. 13 in which the flap 1306 has a first section 1400 movably coupled a second section 1402. The example first section 1400 is aft of the second section 1402 and moves (e.g., telescopes) relative to the second section 1402 to increase or decrease, respectively, a camber and/or a chord of the flap 1306 and, thus, the upper blown surface 1312.

Figure 15:
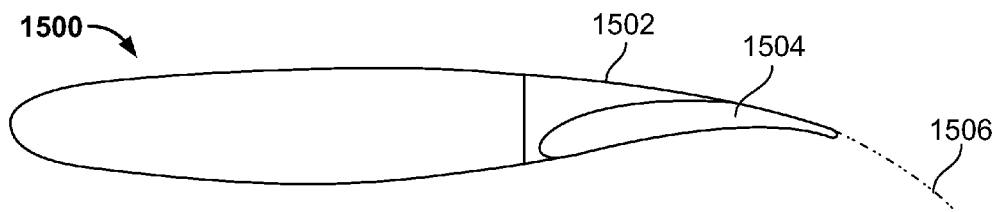
FIG. 15 is a schematic illustrating a motion path of an aft end of a flap of another example wing assembly disclosed herein.

FIG. 15 illustrates another example wing assembly 1500 disclosed herein having a flexible trailing edge 1502 and a flap 1504 movably coupled to the flexible trailing edge 1502. In the illustrated example of FIG. 15, the flap 1504 is in a stowed position. The example flap 1504 is movable in a non-circular first motion path 1506 between the stowed position, a semi-deployed position (FIG. 16) and a deployed position (FIG. 17). In some examples, the flap 1504 is movable along the first motion path 1506 via a one or more actuators coupled to a multi-bar link and/or any other flap support assembly.

Figure 16:
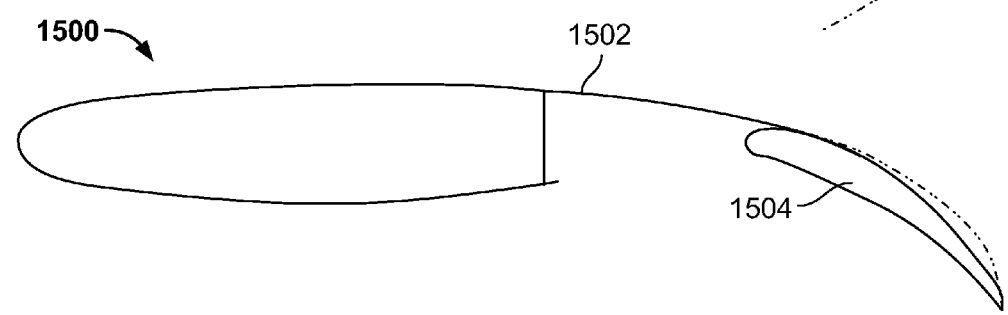
FIG. 16 is a schematic illustrating Fowler motion of the example flap of FIG. 15.
Figure 17:
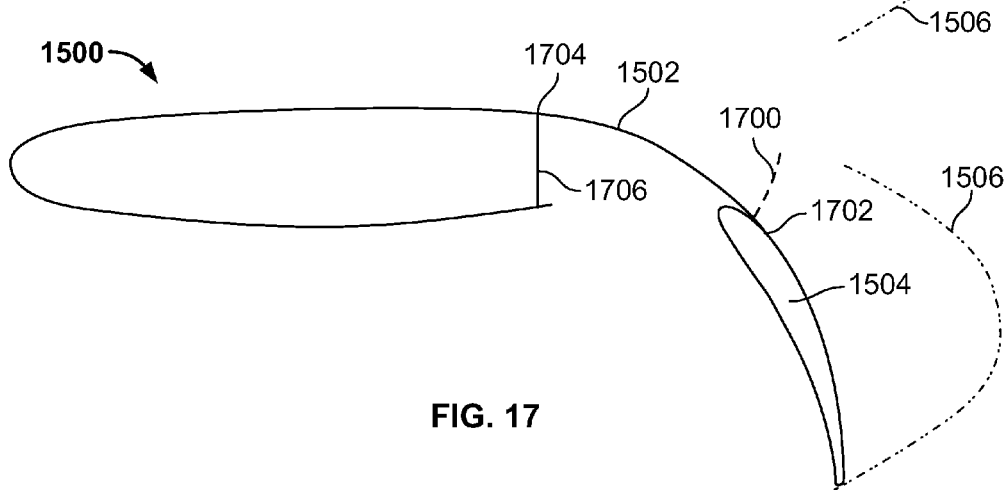
FIG. 17 is a schematic illustrating the example flap of FIGS. 15-16 in a deployed position.

FIG. 16 illustrates the example flap 1504 of FIG. 15 in the semi-deployed position. In the illustrated example, the flap 1504 moves aft from the stowed position to the semi-deployed position substantially without deflection (e.g., bending) of the trailing edge 1502. As a result, the first motion path 1506 provides Fowler motion of the flap 1504 when the example flap 1504 moves from the stowed position to the semi-deployed position. In some examples, the flap 1504 is positioned in the semi-deployed position during take-off.

FIG. 17 illustrates the example flap 1504 of FIGS. 15-16 in the deployed position. As the example flap 1504 moves from the semi-deployed position to the deployed position, the example trailing edge 1502 deflects downward in the orientation of FIG. 17 along second motion path 1700. Deflection of the example trailing edge 1502 facilitates movement of the flap 1504 that increases a camber of the wing assembly 1500 and enables an upper surface 1702 of the wing assembly 1500 to be substantially continuous as the example flap 1504 moves along the first motion path 1506. In the illustrated example, a fore end 1704 of the trailing edge 1502 is fixedly coupled to a spar 1706 of the example wing assembly 1500.

FIG. 18 illustrates another example wing assembly 1800 in accordance with the teachings of this disclosure. The example wing assembly 1800 includes a flexible trailing edge 1802 and a flap 1804 movably coupled to the flexible trailing edge 1802. In the illustrated example, the flap 1804 is in a deployed position. The example flap 1804 defines an upper blown surface 1806 having a first section 1808, a second section 1810 and a third section 1812. In the illustrated example, the first section 1808 has a first radius of curvature and the second section 1810 has a second radius of curvature. The example second radius of curvature is less than the first radius of curvature and forms a swell or convexity. In some examples, the third section 1812 has a third radius of curvature substantially equal to and/or greater than the first radius of curvature. As efflux from an engine and/or air flow along the upper blown surface 1806, a change of slope between the first section 1808, the second section 1810 and/or the third section 1812 of the upper blown surface 1806 causes and/or directs the efflux and/or the air to separate from the flap 1804 (e.g., flow away from the upper blown surface 1806), thereby producing drag. During landing, the drag produced via the second section 1810 of the upper blown surface 1806 enables high thrust levels to be employed without undesirably increasing a landing speed of an aircraft descending at a given glide slope on which the example wing assembly 1800 is employed.

FIG. 19 illustrates the example wing assembly 1800 of FIG. 18 in which the example flap 1804 is in a semi-deployed position. In some examples, the flap 1804 is positioned in the semi-deployed position during take-off. In the illustrated example, when the flap 1804 is positioned in the semi-deployed position, the first section 1808 and the second section 1810 of the upper blown surface 1806 of the flap 1804 are covered by the example trailing edge 1802. As a result, the example second section 1810 produces less or substantially no drag when the example flap 1804 is in the semi-deployed position and/or when the example second section 1810 is fore of the semi-deployed position (e.g., in a stowed position). In the illustrated example, second section 1810 is disposed adjacent an aft end 1900 of the trailing edge 1802. The example third section 1812 of the flap 1804 is aft of the trailing edge 1802.

Figure 20:
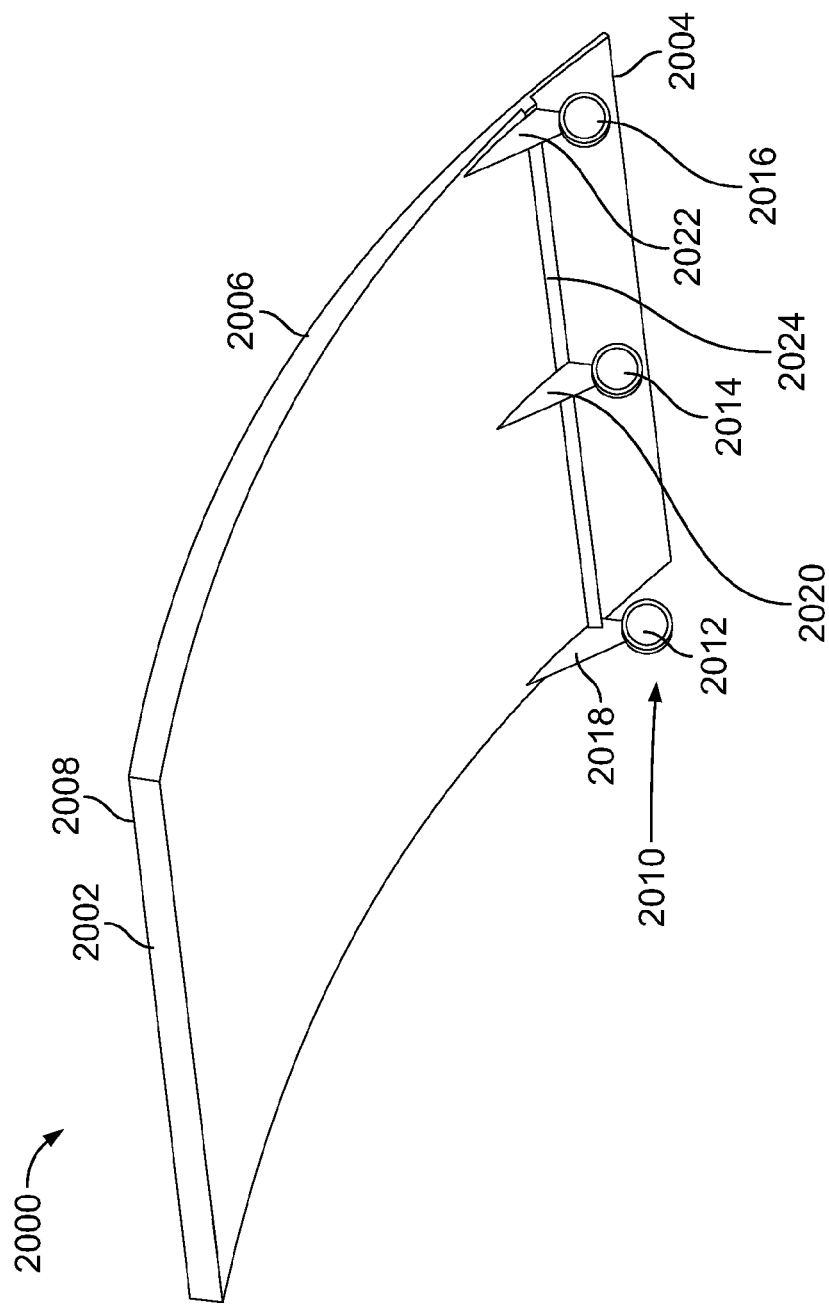
FIG. 20 is a perspective view of an example trailing edge disclosed herein.

FIG. 20 is a perspective, cutaway view illustrating a portion of an example trailing edge 2000 disclosed herein, which may be used to implement the example first trailing edge 201 of FIGS. 1-6, the example second trailing edge 203 of FIGS. 1-6, the example trailing edge 714 of FIGS. 7-12, the example trailing edge 1302 of FIGS. 13-14, the example trailing edge 1502 of FIGS. 16-17, the example trailing edge of FIGS. 18-19 and/or any other trailing edge. Other portions of the trailing edge 2000 along a span of the trailing edge 2000 are not shown. A first end 2002 of the example trailing edge 2000 is to be coupled to a wing box (e.g., cantilevered from a spar, etc.). In some examples, the first end 2002 includes mechanical fasteners, brackets, couplings and/or other devices to couple the trailing edge 2000 to the wing box. A second end 2004 of the example trailing edge 2000 is to abut or juxtapose a flap (e.g., the example first flap 200 of FIGS. 1-6, the example second flap 202 of FIGS. 1-6, the example flap 716 of FIGS. 7-12, the example flap 1306 of FIGS. 13-14, the example flap 1504 of FIGS. 15-17, the example flap 1804 of FIGS. 18-19 and/or any other flexible flap). The example trailing edge 2000 may have any spanwise shape. For example, the trailing edge 2000 may be tapered or twisted along a span of the trailing edge 2000.

In the illustrated example, the trailing edge 2000 includes a flexible skin 2006 defining an upper surface 2008. The example trailing edge 2000 includes a roller assembly 2010. The example roller assembly 2010 is to be operatively coupled to the flap via a track (e.g., the example track 800 of FIG. 8) to enable the flap to move relative to the trailing edge 2000. In the illustrated example, the roller assembly 2010 includes a first wheel 2012, a second wheel 2014 and a third wheel 2016. Other examples include other numbers of roller assemblies (e.g., 2, 3, etc.) and/or other numbers of wheels (e.g., 1, 2, 4, 5, etc.). The example wheels 2012, 2014, 2016 are spaced apart spanwise along the trailing edge 2000 and are coupled to the skin 2006 via brackets or struts 2018, 2020, 2022. In the illustrated example, a spanwise brace or stringer 2024 is coupled to the skin 2006 and the struts 2018, 2020, 2022 to support a portion of a load applied to the trailing edge 2000 by the flap. Some examples do not include the stringer 2024.

In other examples, the trailing edge 2000 includes a slider (e.g., one or more protrusions fixedly coupled to the trailing edge 2000) disposed in the track to slidably couple the flap to the trailing edge 2000. In some example, the slider and/or the track include lubricant(s) and/or low-friction materials such as, for example, plastic to facilitate movement of the slider along the track.

In the illustrated example, the roller assembly 2010 is disposed adjacent the second end 2004 to enable the flap to apply a force or load to the example skin 2006 to elastically deform (e.g., bend) the skin 2006 when the flap moves relative to the trailing edge 2000. In the illustrated example, a thickness of the example skin 2006 decreases from the first end 2002 to the second end 2004. A thickness of the skin 2006 along a span of the skin 2006 is substantially constant in the illustrated example. In other examples, the thickness of the skin 2006 along the span of the skin 2006 is not substantially constant (e.g., the thickness decreases along the span of the skin 2006).

Figure 21:
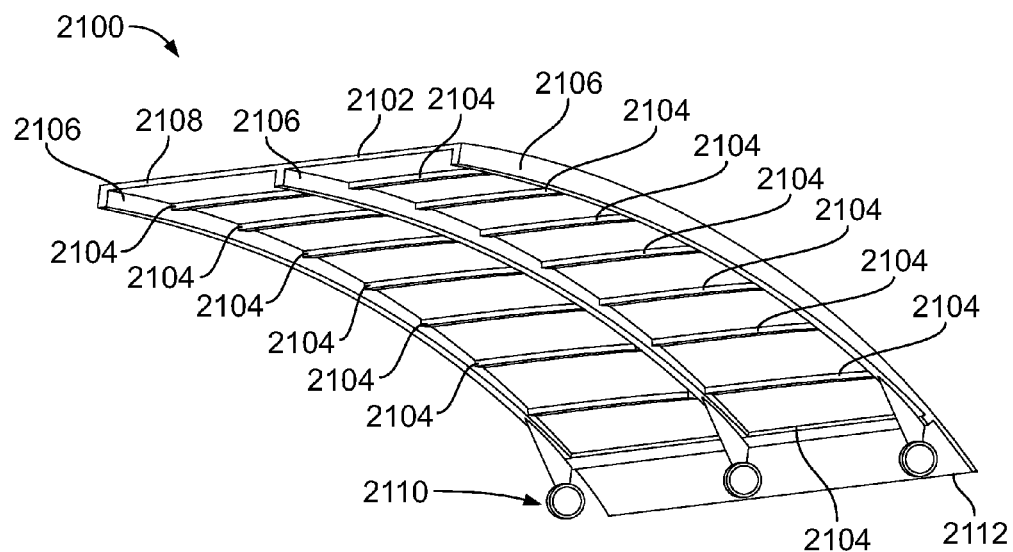
FIG. 21 is a perspective view of another example trailing edge disclosed herein including a plurality of ribs and a plurality of stringers.

FIG. 21 illustrates another example trailing edge 2100 including a skin 2102 supported by a plurality of stringers 2104 and a plurality of flexible ribs 2106. In the illustrated example, the ribs 2106 are spaced apart spanwise along the example trailing edge 2100. The example ribs 2106 extend from a fore end 2108 of the skin 2102 to a roller assembly 2110 coupled to the skin 2102 adjacent an aft end 2112 of the skin 2102. In the illustrated example, the roller assembly 2110 is coupled to the skin 2102 via the ribs 2106. The stingers 2104 of the illustrated example extend spanwise along the skin 2102 and are spaced apart between the fore end 2108 of the skin 2102 and the roller assembly 2110.

In the illustrated example, a flap is to be movably coupled to the trailing edge 2100 via the roller assembly 2110. In other examples, the trailing edge 2100 includes a slider (e.g., one or more protrusions fixedly coupled to the trailing edge 2100) disposed in the track to slidably couple the flap to the trailing edge 2100.

When the flap moves relative to the example trailing edge 2100, the flap applies a load to the skin 2102 via the roller assembly 2110, the ribs 2106 and/or the stringers 2104. In the illustrated example, the load is transferred from the roller assembly 2110 to the skin 2102 directly by the example ribs 2106 and indirectly by the example stringers 2104. In the illustrated example, thicknesses of the ribs 2106 decrease along lengths (e.g., from the fore end 2108 toward the aft end 2112 of the trailing edge 2100) of the ribs 2106. As a result, the example ribs 2106 and, thus, the skin 2102 bend under the load of the flap. In the illustrated example, a thickness of the skin 2102 is substantially constant. In other examples, the thickness of the skin 2102 may not be substantially constant (e.g., the thickness may vary, the thickness may increase or decrease in a spanwise direction, the thickness may increase or decrease from the fore end 2108 to the aft end 2112 of the skin 2102, etc.).

Figure 22:
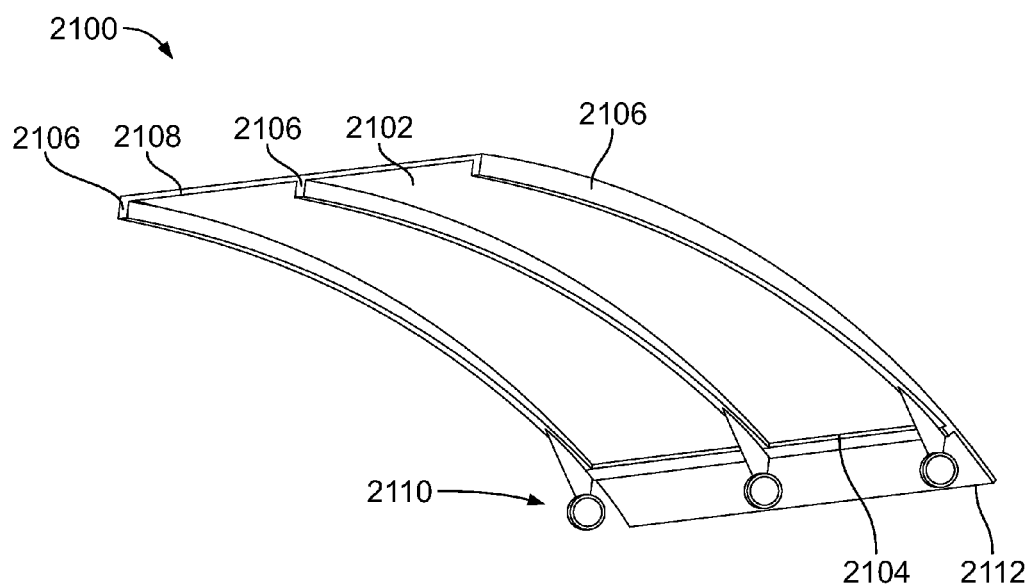
FIG. 22 is a perspective view of the example trailing edge of FIG. 21 including a single stringer.

FIG. 22 illustrates the example trailing edge 2100 of FIG. 21 having a single stringer 2104 coupled to the skin 2102 and the roller assembly 2110. In some examples, two or more stringers are coupled together and/or to the skin 2102 to form the example stringer 2104 of FIG. 22. In the illustrated example, a portion of the load applied to the ribs 2106 is directly transferred to the skin 2102 to facilitate bending of the example trailing edge 2100.

Figure 23:
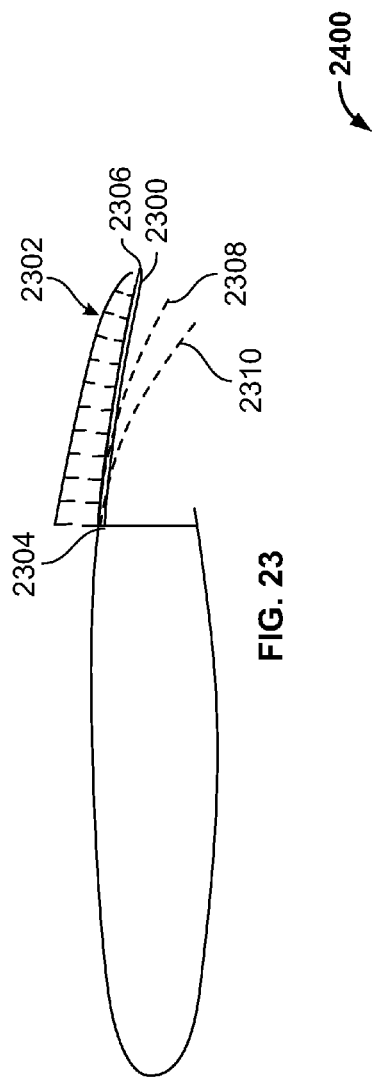
FIG. 23 illustrates an example trailing edge and a plot illustrating an example thickness profile of the trailing edge in accordance with the teachings of this disclosure.

FIG. 23 is a schematic of an example trailing edge 2300 and a plot 2302 illustrating a thickness profile of the trailing edge 2300 in accordance with the teachings of this disclosure. In the illustrated example, a thickness of the trailing edge 2300 decreases from a fore end 2304 to an aft end 2306 of the trailing edge 2300 to enable the trailing edge 2300 to flex or bend under the influence of mechanical stress (e.g., when a load is applied to the trailing edge 2300 via a flap and/or air during flight). In the illustrated example, when the trailing edge 2300 is under substantially no mechanical stress, the trailing edge 2300 is in a first position, which is indicated by line 2308. When the example trailing edge 2300 is in the first position, the trailing edge 2300 has a first curvature. In some examples, the trailing edge 2300 is under substantially no mechanical stress when the flap is in a semi-deployed position.

When the flap is in a stowed position during flight, an upward force in the orientation of FIG. 23 is applied to the trailing edge 2300 via the flap. As a result, the trailing edge 2300 is bent (e.g., straightened) from the first position to a second position. The example trailing edge 2300 is shown in the second position in FIG. 23. When the example trailing edge 2300 is in the second position, the trailing edge 2300 has a second curvature. The second curvature has a greater radius of curvature than the first curvature. When the flap is moved to a deployed position, the flap applies a load to the trailing edge 2300 to bend the trailing edge 2300 to a third position, which is indicated by line 2310. When the trailing edge 2300 is in the third position, the trailing edge 2300 has a third curvature. In the illustrated example, the third curvature has a smaller radius of curvature than the first curvature and the second curvature. In some examples, the first curvature, the second curvature and/or the third curvature is substantially circular. In other examples, the first curvature, the second curvature and/or the third curvature is non-circular.

In the illustrated example, a first amount of deflection of the trailing edge 2300 from the first position (line 2308) to the second position (as shown in FIG. 23) is substantially the same as a second amount of deflection of the trailing edge 2300 from the first position to the third position (line 2310). As a result, an amount of mechanical stress experienced by the example trailing edge 2300 in the second position is substantially the same as the amount of mechanical stress experienced by the trailing edge 2300 in the third position. In other examples, the first amount of deflection and the second amount of deflection are different.

In the illustrated example, a change in curvature of the example trailing edge 2300 is substantially uniform over a length of the trailing edge 2300 (e.g., from the fore end 2304 to the aft end 2306) as the trailing edge 2300 deflects between the second position and the third position. To enable the change in the curvature to be substantially uniform, cross-sectional dimensions and material properties of the example trailing edge 2300 provide a bending rigidity of the trailing edge 2300 at a midpoint of the length of the trailing edge 2300 that is about half of a bending rigidity of the trailing edge 2300 at the fore end 2304. Other examples have dimensions (e.g., thicknesses) and/or materials that enable the trailing edge 2300 to have varying or different changes in curvature along the length of the trailing edge 2300 as the trailing edge 2300 bends. In some examples, the trailing edge 2300 includes one or more material layers to enable the trailing edge 2300 to deflect between the second position and the third position to in a desired shape.

Figure 24:
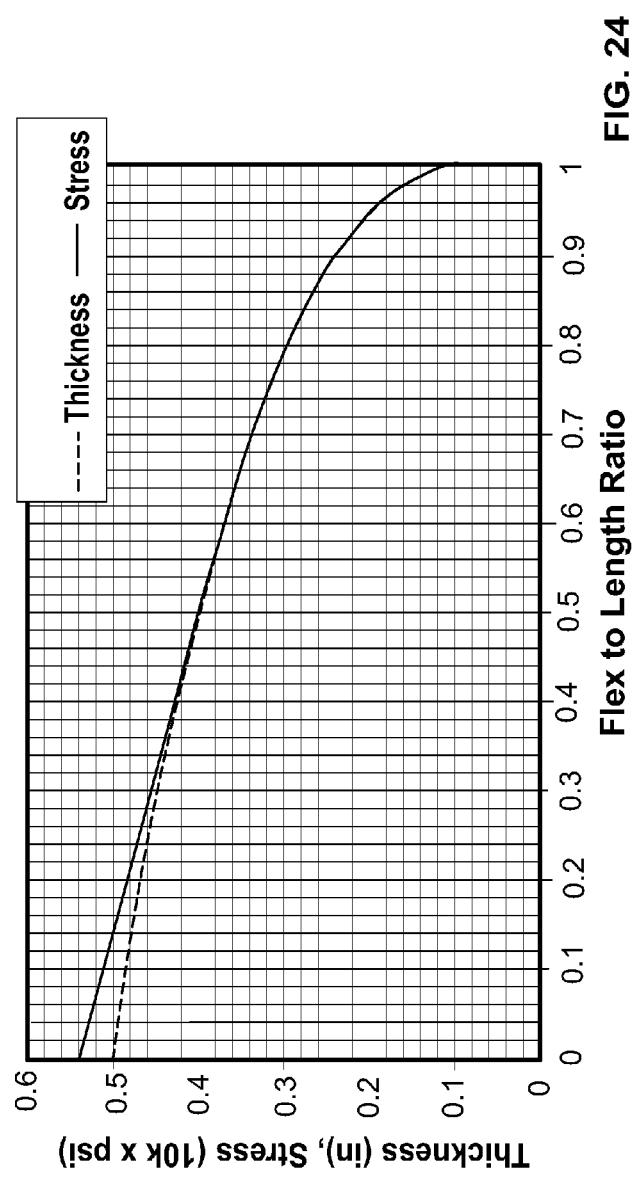
FIG. 24 is a graph plotting the thickness and mechanical stress of the example trailing edge of FIG. 23 over a ratio between flexure and length of the trailing edge.

FIG. 24 is a graph 2400 plotting thickness and mechanical stress of the example trailing edge 2300 of FIG. 23 over a ratio between flexure and the length of the trailing edge 2300. In the illustrated example, the trailing edge 2300 is modeled as a beam to calculate the mechanical stress. In the illustrated example, a thickness of the trailing edge 2300 at the fore end 2304 is approximately 0.5 inches and a modulus of elasticity of a material composing the trailing edge 2300 is approximately 2,000 KSI. However, the above-noted dimension and material property are merely examples and, thus, other dimensions and/or materials having other material properties may be used without departing from the scope of this disclosure. In the illustrated example, the thickness of the trailing edge 2300 decreases non-linearly over the length of the trailing edge 2300.

Figure 25:
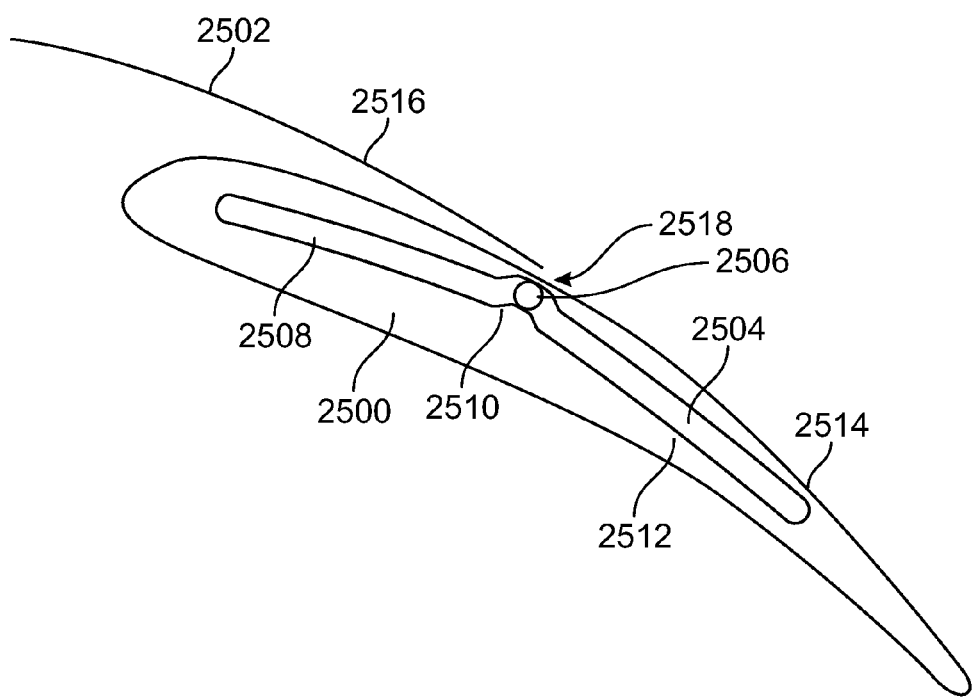
FIG. 25 illustrates an example flap having an example track disclosed herein to enable a gap to form between a trailing edge and the flap.

FIG. 25 is a schematic of an example flap 2500 and an example flexible trailing edge 2502 disclosed herein. In the illustrated example, the flap 2500 is movably coupled to the trailing edge 2502. The example flap 2500 includes a track 2504, and the trailing edge 2502 includes a roller assembly 2506 disposed in the track 2504. The example track 2504 defines a motion path of the flap 2500 relative to the trailing edge 2502.

In some examples, the flap 2500 defines the example track 2504. In some examples, the flap 2500 defines a channel or slot, and the track 2504 is received in the slot and coupled to the flap 2500. In some examples, the track 2504 has a hooked and/or T-shaped cross-sectional shape to enable the track 2504 to engage the roller assembly 2506. In some examples, the track 2504 is disposed in the slot to be recessed from a surface (e.g., an upper surface) of the flap 2500. In some examples, a portion of the track 2504 extends out of the slot. In some examples, the flap 2500 does not include the channel or slot and the track 2504 is coupled to the surface.

In the illustrated example, the track 2504 includes a first section 2508, a second section 2510 and a third section 2512. When the example flap 2500 is positioned relative to the trailing edge 2502 such that the roller assembly 2506 is disposed in the first section 2508 or the third section 2512 of the track 2504, a first upper surface 2514 of the flap 2500 and a second upper surface 2516 of the trailing edge 2502 form a substantially continuous upper blown surface.

In the illustrated example, the second section 2510 of the track 2504 is curved such that the second section 2510 extends from the first section 2508 toward the first upper surface 2514 of the flap 2500 and then extends away from the first upper surface 2514 to the third section 2512. As a result, when the example flap 2500 is positioned relative to the trailing edge 2502 such that the roller assembly 2506 is disposed in the second section 2510 of the track 2504, the first surface 2514 and the second surface 2516 are non-continuous. For example, the second section 2510 of the track 2504 guides the flap 2500 away from the second surface 2516 of the trailing edge 2502 to form a space or gap 2518 between the trailing edge 2502 and the flap 2500. The example gap 2518 enables air flowing beneath the trailing edge 2502 to flow through the gap 2518 and over the first surface 2514 of the flap 2500. The air from beneath the trailing edge 2510 energizes air over the first surface 2514 and produces lift as the air follows a curvature of the first surface 2514.

In other examples, the gap 2518 is formed by extending a length of the roller assembly 2506. For example, the roller assembly 2506 may include an actuator to extend or retract the roller assembly 2506 relative to the trailing edge 2502 to form the gap 2518. In some examples, the roller assembly 2506 includes an extendible link coupled via one or more explosive bolts. If the explosive bolts are activated, the bolts decouple from the link to enable the link to extend, thereby forming the gap 2518.

Figure 26:
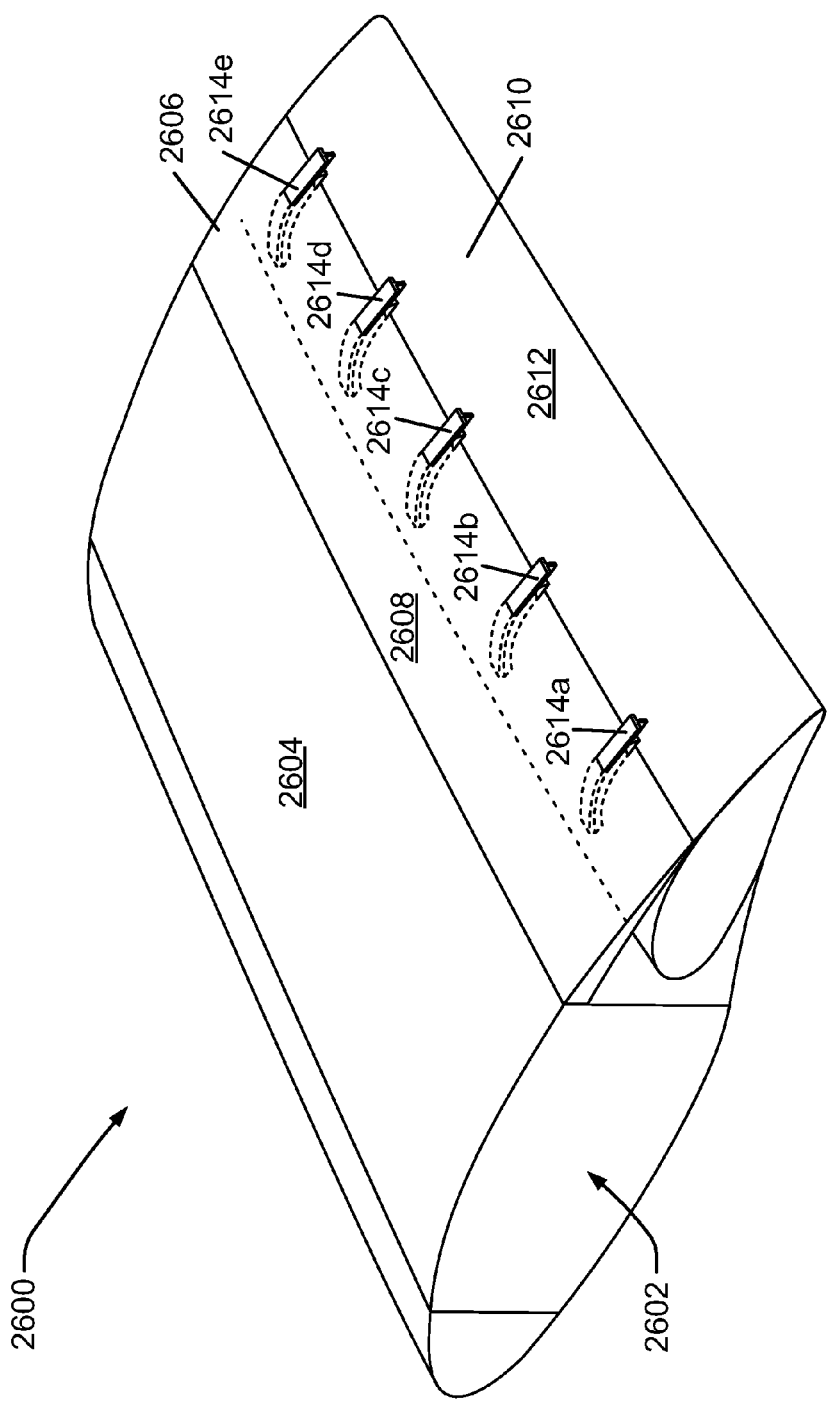
FIG. 26 is a perspective, cross-sectional view of another example wing assembly disclosed herein.

FIG. 26 is a perspective, cross-sectional view of another example wing assembly 2600 disclosed herein. Aspects of the example wing assembly 2600 may be used to implement the example first wing assembly 104 of FIGS. 1-6, the example second wing assembly 106 of FIGS. 1-6, the example wing assembly 700 of FIGS. 7-12, the example wing assembly 1300 of FIGS. 13-14, the example wing assembly 1500 of FIGS. 15-17, the example wing assembly 1800 of FIGS. 18-19, and/or another example wing assembly. In the illustrated example, the wing assembly 2600 includes a wing box 2602 having a first upper surface 2604, a flexible trailing edge 2606 including a second upper surface 2608, and a flap 2610 including a third upper surface 2612. In the illustrated example, the first upper surface 2604, the second upper surface 2608 and the third upper surface 2612 form a substantially continuous upper blown surface. The example flap 2610 is movably coupled to the trailing edge 2606 via five tracks 2614a-2614e. In other examples, the wing assembly 2600 includes other numbers of tracks (e.g., 1, 2, 4, 6, 7, 10, etc.). The example tracks 2614a-2614e define a motion path of the flap 2610 relative to the trailing edge 2606. In the illustrated example, the flap 2610 is in a stowed position.

Figure 27:
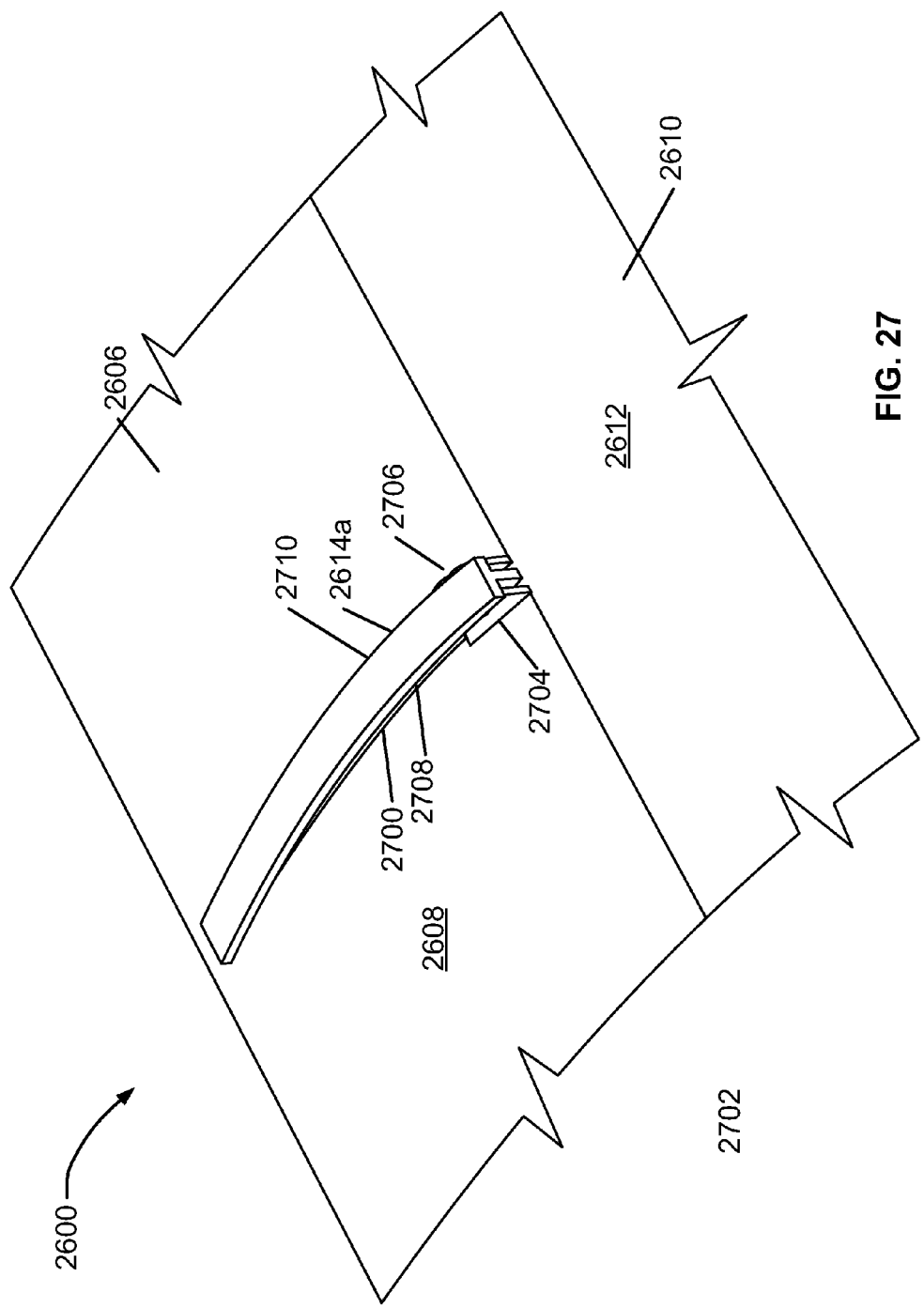
FIG. 27 is a perspective view of an example track of the wing assembly of FIG. 26.

FIG. 27 is a perspective view of one of the example tracks 2614a-2614e of FIG. 26. In the illustrated example, the track 2614a is coupled to the third upper surface 2612 of the flap 2610. The example track 2614a extends from the third upper surface 2612 through a slot 2700 of the trailing edge 2606. A roller assembly 2702 is coupled to the second upper surface 2608 of the trailing edge 2606. The example roller assembly 2702 has a first roller 2704 and a second roller 2706. In other examples, the roller assembly 2702 includes other numbers of rollers (e.g., 1, 3, 4, 5, etc.). The first roller 2704 is coupled to a first side 2708 of the track 2614a, and the second roller 2706 is coupled to a second side 2710 of the track 2614a. In the illustrated example, the track 2614a has a T-shaped cross-section. In other examples, the track 2614a has other cross-sectional shapes such as, for example, an I-shaped cross-section.

FIGS. 28-29 are side, cross-sectional views of the example wing assembly 2600 of FIGS. 26-27. In the illustrated example, the track 2614a is curved and has a first curvature similar or identical to a second curvature of the third upper surface 2612 of the flap 2610. In other examples, the first curvature is different than the second curvature. For example, the track 2614a may have a curvature similar or identical to the example track 2504 of FIG. 25. In the illustrated example, when the flap 2610 is in the stowed position, a first portion of the track 2614a extends through of the slot 2700 (e.g., the first portion is not covered by the trailing edge 2606), and a second portion of the track 2614a is covered by the trailing edge 2606. The example roller assembly 2702 of FIG. 28 is disposed adjacent an aft end 2800 of the track 2614a. When the flap 2610 moves toward a deployed position, the track 2614a applies a force to the roller assembly 2702 and guides or directs the roller assembly 2702 downward in the orientation of FIGS. 28-29. As a result, the example trailing edge 2606 elastically deforms (e.g., bends) from a first shape to a second shape. The example roller assembly 2702 is disposed adjacent a fore end 2802 of the track 2614a when the example flap 2610 is in the deployed position. When the example flap 2610 moves from the deployed position to the stowed position, the track 2614a applies a force to the roller assembly 2702 and guides the roller assembly 2702 upward in the orientation of FIGS. 28-29. As a result, the example trailing edge 2606 elastically deforms from the second shape to the first shape.

Figure 30:
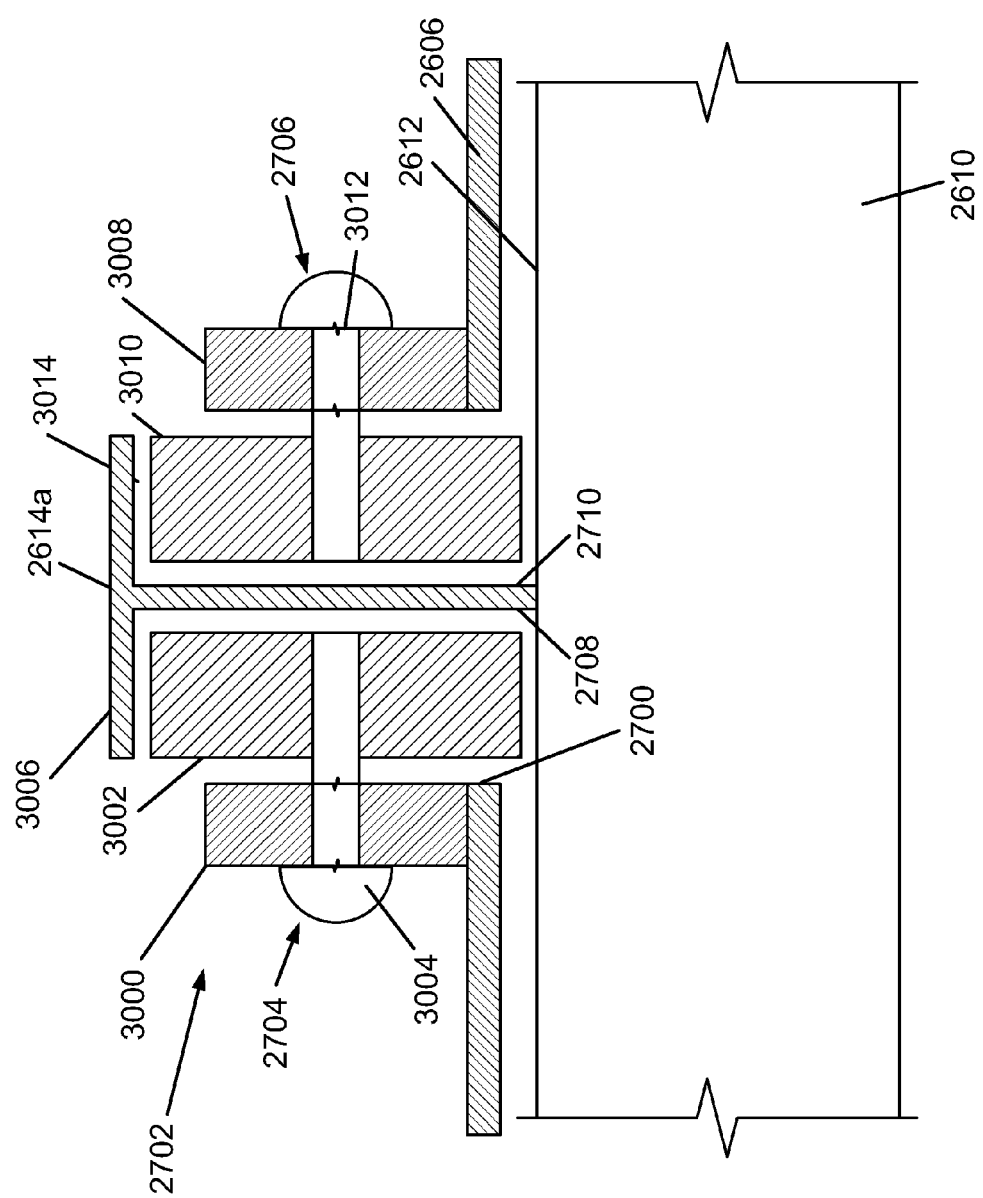
FIG. 30 is a cross-sectional view of an example roller assembly operatively coupled to the track of FIGS. 27-29.

FIG. 30 is a cross-sectional view of the example roller assembly 2702 along line A-A of FIG. 29. In the illustrated example, the first roller 2704 includes a first bracket 3000, a first wheel 3002 and a first axle 3004. The example first axle 3004 rotatably couples the first wheel 3002 to the first bracket 3000. The first axle 3004 may be a fastener (e.g., a rivet), a pin, a shaft, a bearing and/or any other axle. In some examples, the first wheel 3002 is in contact with the third upper surface 2612 of the flap 2610 and/or a first flange 3006 of the track 2614a.

The example second roller 2706 includes a second bracket 3008, a second wheel 3010 and a second axle 3012. The example second axle 3012 may be a fastener, a pin, a shaft, a bearing and/or any other axle. In some examples, the second wheel 3010 is in contact with the third upper surface 2612 of the flap and/or a second flange 3014 of the track 2614a. In some examples, the roller assembly 2702 includes other numbers of wheels (e.g., 1, 3, 4, 5, etc.). Additionally or alternatively, other types of roller assemblies and/or sliders are employed.

In the illustrated example, the track 2614a is coupled to the third upper surface 2612 (e.g., a skin) of the flap 2610. In other examples, the track 2614a is coupled to other portions of the flap 2610. For example, the track 2614a may extend through a slot or aperture of the third upper surface 2612 to be coupled to a rib and/or a rib cap of the flap 2610. In some examples, the track 2614a includes a third flange and a fourth flange opposite the first flange 3006 and the second flange 3008, respectively. For example, the track 2614a may have an I-shaped cross-sectional shape. The third flange and/or the fourth flange may be coupled to the third upper surface 2612 and/or any other portion of the flap 2610.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a trailing edge of a wing of an aircraft, the trailing edge having a flexible skin defining a first surface;
   a flap movably coupled to the trailing edge, the flap defining a second surface, the first surface and the second surface form a substantially continuous surface when the flap is in a stowed position and when the flap is in a deployed position; and
   a track coupled to the flap to provide a motion path of the flap relative to the trailing edge, the track positioned adjacent the second surface of the flap, the motion path to be provided by the track, the track having a curvature that is substantially similar to a curvature of the second surface of the flap.

2. The apparatus of claim 1, wherein the first surface is to bend when the flap moves from the stowed position to the deployed position.

3. The apparatus of claim 1, wherein the trailing edge is fixedly coupled to a spar of the wing.

4. The apparatus of claim 1, wherein a first portion of the skin has a first thickness and a second portion of the skin has a second thickness different than the first thickness.

5. The apparatus of claim 1, wherein the trailing edge includes at least one of a roller or a slider operatively coupled to the track.

6. The apparatus of claim 1, wherein the flap is movable to a third position to provide a gap between the trailing edge and the flap.

7. The apparatus of claim 1, wherein the trailing edge includes a flexible rib coupled to the skin.

8. The apparatus of claim 7, wherein the trailing edge includes a stringer coupled to the skin and the rib.

9. The apparatus of claim 1, wherein the flap is an upper surface blown flap.

10. The apparatus of claim 1, wherein a first slope of the first surface and a second slope of the second surface are substantially similar at a juncture of the first surface and the second surface.

11. An apparatus, comprising:
    a trailing edge of a wing of an aircraft, the trailing edge having a first end fixed to the wing and a second end opposite the first end, the trailing edge having a flexible upper surface and a flexible lower surface, the flexible upper surface and the flexible lower surface being elastically deformable to enable the second end to bend relative to the first end; and
    a flap movably coupled to the second end of the trailing edge, the flexible upper surface and the flexible lower surface of the trailing edge to elastically deform between a first shape and a second shape different from the first shape when the flap moves between a first position and a second position relative to the trailing edge, the flap and the trailing edge to provide a substantially continuous upper blown surface when the flap moves between the first position and the second position; and
    a track formed in the flap, the track to provide a motion path of the flap relative to the trailing edge, the track being positioned adjacent an upper surface of the flap defining the upper blown surface, the track having a curvature that is substantially similar to a curvature of the upper surface of the flap.

12. The apparatus of claim 11, further comprising an actuator operatively coupled to the flap to move the flap from the first position to the second position.

13. The apparatus of claim 12, wherein the actuator is to rotate the flap about a hinge to move the flap from the first position to the second position, the hinge to be substantially stationary relative to the wing.

14. The apparatus of claim 11, wherein the flap is to move in a circular path from the first position to the second position.

15. An apparatus, comprising:
    a trailing edge of a wing of an aircraft, the trailing edge being elastically deformable, the trailing edge includes a first end fixed to the wing and a second end opposite the first end to move relative to the first end;
    a flap movably coupled to the trailing edge, the trailing edge and the flap to define a substantially continuous upper blown surface, the flap to apply a load to the trailing edge to cause the trailing edge to elastically deform between a first position and a second position when the flap moves between a stowed position and a deployed position, the flap having a track formed in the flap to provide a motion path of the flap relative to the trailing edge, the track being positioned adjacent an upper surface of the flap, the track having a curvature that is substantially similar to a curvature of the upper surface of the flap.

16. The apparatus of claim 15, wherein a portion of the upper blown surface is to have a substantially constant radius of curvature.

17. The apparatus of claim 15, wherein a first section of the flap has a first radius of curvature and a second section of the flap has a second radius of curvature less than the first radius of curvature, the second section to be covered by the trailing edge when the flap is in the first position, the second section to define a portion of the upper blown surface when the flap is in the second position.

18. The apparatus of claim 15, wherein a change in curvature of the trailing edge is to be substantially uniform along a chord of the trailing edge.

19. The apparatus of claim 15, wherein the flap includes a first section and a second section, the first section movable relative to the second section to change a size of the flap.

20. The apparatus of claim 1, wherein the track and the flap provide a unitary structure.

21. The apparatus of claim 11, wherein the first end of the trailing edge is directly attached to a spar of the wing without a hinge.

22. The apparatus of claim 1, wherein the track and a deflection of the trailing edge enable a turning radius of the flap to be smaller than a radius of curvature of the continuous surface formed by the first surface and the second surface.

23. The apparatus of claim 1, wherein the track enables the trailing edge to deflect between a first shape having a first curvature and a second shape having a second curvature different than the first curvature when the flap moves between a first position and a second position relative to the trailing edge via the track.

24. The apparatus of claim 11, further comprising an actuator operatively coupled to the second end of the trailing edge to apply a load to the trailing edge to elastically deform the trailing edge.

25. The apparatus of claim 11, wherein the trailing edge is to bend to elastically deform as the flap moves between the first position and the second position.

26. The apparatus of claim 11, further comprising a slider coupled to the second end of the trailing edge, the slider to slidably engage the track.

27. The apparatus of claim 26, wherein the flap moves fore or aft relative to the trailing edge about a motion path defined by the track.

28. The apparatus of claim 26, wherein an end of the track engages the slider to cause the second end of the trailing edge to elastically deform when the flap is in the second position.

29. The apparatus of claim 15, wherein the track and a deflection of the trailing edge enable a turning radius of the flap to be smaller than a radius of curvature of the upper blown surface.

30. The apparatus of claim 15, wherein the track is to receive a roller of the trailing edge.

31. The apparatus of claim 15, wherein the track is positioned adjacent an upper surface defined by a first section of the flap and a second section of the flap.

32. The apparatus of claim 31, wherein the track includes a first portion having a first radius of curvature and a second portion having a second radius of curvature, the first portion of the track extending along the first section of the flap and the second portion of the track extending along the second section of the flap.

33. The apparatus of claim 15, further comprising a single actuator to move the flap relative to the trailing edge and cause the trailing to deflect relative to a wing box of the wing.

34. The apparatus of claim 15, wherein the flap pulls on the trailing edge in a downward direction when the flap is in the deployed position to cause the trailing edge to elastically deform.

35. The apparatus of claim 15, wherein the trailing edge has a first curvature when the flap is in a first position and a second curvature different than the first curvature when the flap is in a second position aft of the first position.

\* \* \* \* \*